United States Patent
Ohashi et al.

(10) Patent No.: US 8,833,514 B2
(45) Date of Patent: Sep. 16, 2014

(54) OPEN AIR LAYER-TYPE VIBRATION REDUCTION STRUCTURE

(75) Inventors: Shinji Ohashi, Tokyo (JP); Hiroshi Ohyama, Tokyo (JP); Kazuhiro Takashima, Tokyo (JP); Yuichi Miyazaki, Tokyo (JP)

(73) Assignee: Nittobo Acoustic Engineering Co., Ltd. (JP)

( * ) Notice: Subject to any disclaimer, the term of this patent is extended or adjusted under 35 U.S.C. 154(b) by 0 days.

(21) Appl. No.: 13/808,354

(22) PCT Filed: Jul. 12, 2011

(86) PCT No.: PCT/JP2011/065842
§ 371 (c)(1),
(2), (4) Date: Jan. 4, 2013

(87) PCT Pub. No.: WO2012/008428
PCT Pub. Date: Jan. 19, 2012

(65) Prior Publication Data
US 2013/0106037 A1    May 2, 2013

(30) Foreign Application Priority Data

Jul. 15, 2010 (JP) .................... 2010-160782

(51) Int. Cl.
| | |
|---|---|
| E04B 1/82 | (2006.01) |
| G10K 11/172 | (2006.01) |
| F16F 15/02 | (2006.01) |
| F16F 15/023 | (2006.01) |
| E04B 1/98 | (2006.01) |
| E04B 1/86 | (2006.01) |
| E04B 1/84 | (2006.01) |

(52) U.S. Cl.
CPC ............ *E04B 1/98* (2013.01); *E04B 2001/8442* (2013.01); *E04B 2001/8433* (2013.01); *G10K 11/172* (2013.01); *F16F 15/022* (2013.01); *F16F 15/023* (2013.01); *E04B 1/86* (2013.01)
USPC .......................................... 181/290; 181/294

(58) Field of Classification Search
USPC ............ 181/198, 284, 290, 292, 294; 52/144; 267/152, 153
See application file for complete search history.

(56) References Cited

U.S. PATENT DOCUMENTS

| | | | | |
|---|---|---|---|---|
| 4,539,244 A | * | 9/1985 | Beggs et al. ................... | 428/116 |
| 6,021,612 A | * | 2/2000 | Dunn et al. ..................... | 52/144 |

(Continued)

FOREIGN PATENT DOCUMENTS

| | | |
|---|---|---|
| JP | 09-273241 | 10/1997 |
| JP | 2002-268647 | 9/2002 |

(Continued)

OTHER PUBLICATIONS

Takahashi et al. "Study on Improvement of Sound Insulation Performance of Double Glazing Window—Proposal of Double-Window Structure Using Micropore-Perforated Panel", *Acoustical Society of Japan Collection (Autumn 2009 Edition) of Autumn 2009 Meeting of the Acoustical Society of Japan* pp. 1009-1010 (2009).

(Continued)

*Primary Examiner* — Christopher Schwartz
(74) *Attorney, Agent, or Firm* — Myers Bigel Sibley & Sajovec, P.A.

(57) ABSTRACT

The open air layer-type vibration reduction structure is provided with at least one plate-like member of which the obverse surface faces toward the open space side; and a frame spaced at an interval from the reverse surface of the plate-like member, and an air layer is formed between the plate-like member and the frame. An air-permeable ventilation portion is formed in at least one of the plate-like member and the frame, such that the average value of the flow resistance on the surface of at least one of the plate-like member and the frame, which forms an air layer, is in a range greater than $0 \text{ N·s/m}^3$ and equal to or less than $1,000 \text{ N·s/m}^3$. The ventilation portion may be configured such that the sound pressure level generated within the air layer by applying an external force to the air layer is reduced by 3 dB or more.

15 Claims, 14 Drawing Sheets

(56) References Cited

U.S. PATENT DOCUMENTS

| | | | | |
|---|---|---|---|---|
| 6,345,688 B1* | 2/2002 | Veen et al. | ............... | 181/290 |
| 2009/0120717 A1* | 5/2009 | Tanase | ............... | 181/284 |
| 2010/0044148 A1* | 2/2010 | Tanase | ............... | 181/198 |
| 2010/0089691 A1* | 4/2010 | Nakamura et al. | ............... | 181/286 |

FOREIGN PATENT DOCUMENTS

| | | |
|---|---|---|
| JP | 2003-056092 | 2/2003 |
| JP | 2003-295867 | 10/2003 |
| JP | 2007-011034 | 1/2007 |
| JP | 2007-100394 | 4/2007 |
| JP | 2008-285857 | 11/2008 |
| JP | 2010-007278 | 1/2010 |

OTHER PUBLICATIONS

Takahashi et al. "Study on Double-Window Structure Using Micropore-Perforated Panel", *Acoustical Society of Japan Collection* (*Spring 2010 Edition*) *of Spring 2010 Meeting of the Acoustical Society of Japan* pp. 1159-1160 (2010).

Takahashi et al. "Study on Effect of Air Gaps on Heavy-Weight Impact Sound of Double-Floor System", *Acoustical Society of Japan Collection* (*Spring 2010 Edition*) *of Spring 2010 Meeting of the Acoustical Society of Japan* pp. 1181-1182 (2010).

International Search Report corresponding to International Application No. PCT/JP2011/065842 mailed Oct. 18, 2011.

First Office Action corresponding to Chinese Application No. 201180034165.5 issued Apr. 22, 2014.

* cited by examiner

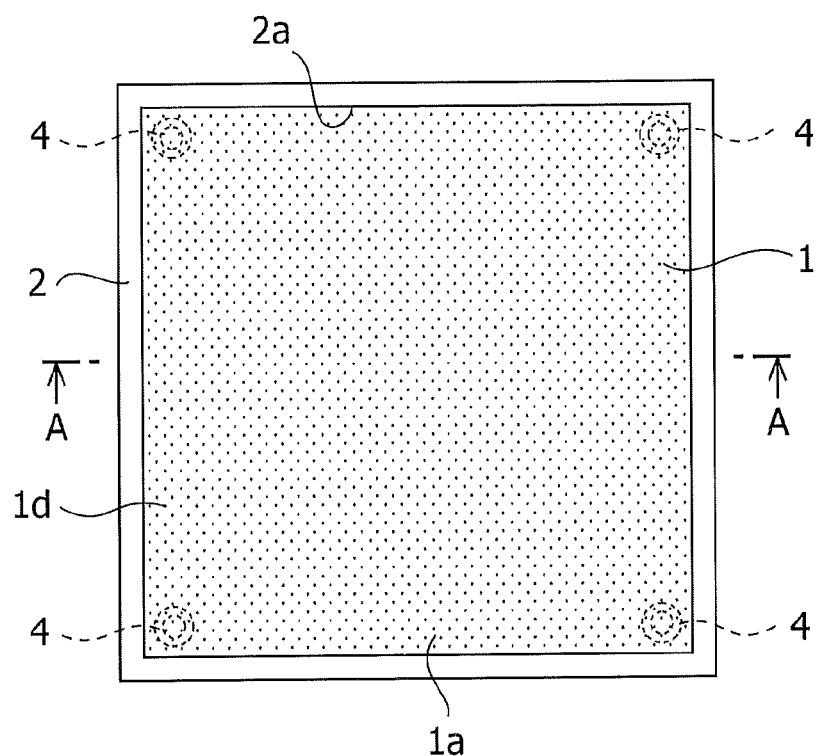
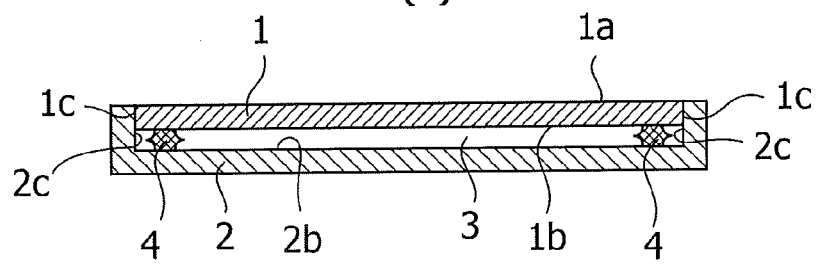

OPEN AIR LAYER-TYPE VIBRATION REDUCTION STRUCTURE

RELATED APPLICATIONS

This application is a 35 U.S.C. §371 national stage application of PCT Application No. PCT/JP2011/065842, filed on Jul. 12, 2011, which claims priority from Japanese Application No. 2010-160782 filed Jul. 15, 2010, the contents of which are incorporated herein by reference in their entireties. The above-referenced PCT International Application was published as International Publication No. WO 2012/008428 A1 on Jan. 19, 2012.

TECHNICAL FIELD

The present invention relates to an open air layer-type vibration reduction structure as a newly proposed structure. More specifically, the present invention relates to an open air layer-type vibration reduction structure that includes: a plate-like member of which an obverse surface faces toward an open space side; and a frame arranged with an interval from a reverse surface of the plate-like member, wherein an air layer is formed between the plate-like member and the frame.

BACKGROUND ART

In order to reduce noise and vibration, a sound insulation structure and a vibration insulation structure, which are respectively configured to damp noise and vibration, are provided in an indoor space of a building, an interior space of an automobile, a road, or the like.

With respect to the sound insulation structure, NPL 1 and NPL 2, for example, disclose a structure of double glazing glass used for a window and the like installed at an interior of a building. In the structure disclosed in NPL 1 and NPL 2, a micropore perforated panel, in which micropores are pierced, is arranged on one surface of the double glazing glass to insulate sound incident from the side of the micropore-perforated panel. In addition, PTL 1 and PTL 2 disclose a structure for absorbing sound incident from an indoor space that is a sound field. In the structure disclosed in PTL 1 and PTL 2, the micropore-perforated panel is arranged such that the obverse surface thereof faces the indoor space that is a sound field, and the reverse surface thereof faces a wall or a ceiling. Furthermore, an air layer is formed between the micropore-perforated panel and the wall or the ceiling, and a plurality of tubular members is arranged on the reverse surface of the micropore-perforated panel for each of the plurality of perforations of the micropore-perforated panel.

With respect to vibration and noise that are problems relating to, in particular, a structure of a building, a load, such as an impact, is applied to a structure of a building due to a behavior of a person existing in the building. Furthermore, vibration may occur based on this impact, and then the vibration may cause solid borne sound (i.e., floor impact sound). PTL 3 discloses a structure of a ceiling and a wall that insulate floor impact sound particularly applied from an upper floor of a building. In the structure of the wall and the ceiling disclosed in PTL 3, a perforated board is arranged on the side of an indoor space of a frame that is the base having a clearance from the frame, an air layer is provided between the frame and the perforated board, and a support member that is made of a rigid material, is arranged between the perforated board and the frame so as to support the perforated board.

In addition, in order to reduce vibration that may occur due to a load applied to a structure of a building, a double structure is conventionally employed for a floor structure of an interior of a building. In the double structure, a floor member is arranged such that the obverse surface thereof faces the side of the indoor space and the reverse surface thereof faces a frame that is the base, an air layer is formed between the floor member and the frame, and the floor member is supported by a vibration proof rubber arranged between the floor member and the frame. NPL 3 discloses a method for changing floor impact sound that may occur due to a load applied to a structure of a building by changing the thickness of an air layer in the double structure described above.

CITATION LIST

Patent Literature

PTL 1: Japanese Patent Application Laid-Open No. 2007-11034
PTL 2: Japanese Patent Application Laid-Open No. 2010-7278
PTL 3: Japanese Patent Application Laid-Open No. 2003-56092

Non-Patent Literature

NPL 1: Hirotsugu Takahashi and two others, Study on Improvement of Sound Insulation Performance of Double Glazing Window—Proposal of Double-Window Structure Using Micropore-Perforated Panel, the Acoustical Society of Japan Collection (Autumn 2009 Edition) of Autumn 2009 Meeting of the Acoustical Society of Japan, September 2009, pp. 1009-pp. 1010

NPL 2: Hirotsugu Takahashi and two others, Study on Double-Window Structure Using Micropore-Perforated Panel, the Acoustical Society of Japan Collection (Spring 2010 Edition) of Spring 2010 Meeting of the Acoustical Society of Japan, March 2010, pp. 1159-pp. 1160

NPL 3: Hirotsugu Takahashi and two others, Study on Effect of Air Gaps on Heavy-Weight Impact Sound of Double-Floor System, the Acoustical Society of Japan Collection (Spring 2010 Edition) of Spring 2010 Meeting of the Acoustical Society of Japan, March 2010, pp. 1181-pp. 1182

SUMMARY OF INVENTION

Technical Problem

However, the structures discussed by PTL 1, PTL 2, NPL 1, and NPL 2 consider the insulation of sound that transmits through a micropore-perforated panel from the side of an interior space only. More specifically, with the structures described above, a vibration insulation effect against a load, such as an impact applied to a structure of a building, cannot be fully obtained. In addition, in the structure disclosed in PTL 3, vibration may be easily transmitted between the perforated board and the frame, because the perforated board is supported by the support member that is made of a rigid material. Accordingly, a vibration insulation effect against a load, such as an impact applied to a structure of a building, cannot be fully obtained.

It is known that in order to reduce vibration that may occur due to a load, such as an impact applied to a structure of a building, it is useful to use a vibration proof rubber in the double structure of a floor described above. Accordingly, a conventional vibration-proof structure is basically designed in consideration of such characteristics, such as a spring constant of a vibration proof rubber. With respect to the double structure of a floor, the following results for a vibration proof rubber-equipped structure, which are illustrated by a solid line S1, were obtained, and the results for a structure with no vibration proof rubber, which are illustrated by a broken line S2, were obtained as illustrated in FIG. 16, as a result of the following experiment on the double structure of a floor. More specifically, with respect to a double structure of a floor, for each of a structure that has a vibration proof rubber (hereinafter simply referred to as a "vibration proof rubber-equipped structure"), and a structure that has no vibration proof rubber and is configured such that a floor member was freely supported by lifting the floor member (hereinafter simply referred to as a "structure with no vibration proof rubber"), a frame side was excited by using a vibration generator, the vibration acceleration, at a plurality of locations on the floor member and the frame, were respectively measured, and the results were calculated for each frequency by using the amount of vibration insulation effects, i.e., a difference between an average value of the vibration acceleration of the frame and the average value of the vibration acceleration of the floor member (=(average value of the vibration acceleration of the frame)−(average value of the vibration acceleration of the floor member)). Note that in the chart illustrated in FIG. 16, the vibration insulation effect amount (dB) is on the vertical axis, and the frequency (Hz) is on the horizontal axis illustrated as a logarithmic axis.

As shown FIG. 16, the peak of a resonance frequency f0 (=approximately 7.4 Hz), which is illustrated with an arrow X, and the peak of a resonance frequency f1 (=approximately 12 Hz), which is illustrated by an arrow Y, were observed for the vibration insulation effect amount for the vibration proof rubber-equipped structure. In contrast, no such peak was observed for the vibration insulation effect amount for the structure with no vibration proof rubber. On the other hand, in FIG. 16, the vibration insulation effect amounts for both the vibration proof rubber-equipped structure and the structure with no vibration proof rubber did not substantially change in a frequency domain after the peak of a resonance frequency f2 (=approximately 46 Hz), which is illustrated by an arrow Z. Referring to FIG. 17, in a normal mode of vibration in which the resonance frequency is f0, the entire floor member vertically moves. Referring to FIG. 18, in a normal mode of vibration in which the resonance frequency is f1, the floor member moves such that a maximum amplitude is obtained for respective corner portions of the floor member in clockwise order. The normal mode of vibrations of which resonance frequencies are f0 and f1 are normal mode of vibrations arising based on a spring characteristic of the vibration proof rubber. On the other hand, as shown in FIG. 19, in a normal mode of vibration in which the resonance frequency is f2, the floor member moves in an arch-like shape such that the maximum amplitude is obtained in the center of the floor member in the direction of one side thereof. Accordingly, the normal mode of vibration, of which the resonance frequency is f2, is a normal mode of vibration arising based on the characteristic of the floor member. As a result, the effect of the vibration proof rubber is not exerted well for the natural vibration that may occur due to a characteristic of the floor member. Therefore, if the characteristic such as the spring constant of the vibration proof rubber only is considered, a sufficiently high vibration insulation effect cannot be achieved in the double structure of a floor.

With respect to the effect of the air layer in the double structure of the floor described above, as disclosed in NPL 3, it is only known that floor impact sound changes if the thickness of the air layer in the double structure is changed. More specifically, in the conventional method, vibration that may occur due to a load applied on a structure of a building, cannot be sufficiently reduced considering the effect of the air layer.

In addition, with respect to acoustic transmission through a sound insulation structure, such as a micropore-perforated panel and a perforated board, which is disclosed PTL 1 to PTL 3 and NPL 1 to NPL 3, if the sound insulation performance is determined based on a difference between: the sound pressure level on an incident side of a sound insulation structure, to which the acoustic wave emitted from a sound source is incident; and the sound pressure level on a transmission side of the sound insulation structure, to which the acoustic wave that has been emitted from the sound source and has been incident to and transmitted through the sound insulation structure, the same sound insulation performance can be obtained even in a case in which the incident side and the reflection side are reversed. In other words, the reversibility rule establishes with respect to the sound transmission through the sound insulation structure disclosed in PTL 1 to PTL 3 described above. However, in the double structure of a floor described above, the vibration characteristic of the vibration that may occur on the frame side when the side of the floor member is excited, and the vibration characteristic of the vibration that may occur on the side of the floor member when the frame side is excited, may tend to differ from each other. To paraphrase this, the reversibility rule does not establish with respect to the vibration characteristic of vibration between the floor member and the frame in the double structure of a floor described above.

Accordingly, in order to achieve a high vibration insulation effect in a vibration insulation structure, such as the double structure of a floor, it is important to consider complex conditions, such as the air layer provided between a floor member and a frame, and the rigidity and the weight of the floor member and the frame.

The present invention is devised to solve the above-described problems. An object of the present invention is to provide an open air layer-type vibration reduction structure as a new technique that can effectively reduce vibration that may occur due to a load such as an impact.

Solution to Problem

In order to solve the above-described problems, according to an aspect of the present invention, an open air layer-type vibration reduction structure includes: at least one plate-like member arranged such that an obverse surface thereof faces an open space; and a frame arranged with an interval from a reverse surface of the plate-like member that opposes the obverse surface of the plate-like member. In the open air layer-type vibration reduction structure, an air layer is formed between the plate-like member and the frame, and ventilation portions having air permeability are formed on at least one of the plate-like member and the frame such that an average value of flow resistance on a surface of at least one of the plate-like member and the frame that forms the air layer, is in a range greater than 0 N·s/m$^3$ and equal to or less than 1,000 N·s/m$^3$. Preferably, the ventilation portions are configured such that a sound pressure level generated within the air layer by applying an external force to the air layer is reduced by 3 dB or more in a dominant frequency, in comparison with a case in which the plate-like member and the frame have no air permeability, the dominant frequency being based on characteristics of a series of systems including the plate-like member, the frame, and the air layer. Accordingly, air can pass through the ventilation portion of at least one of the plate-like member and the frame that has the air permeability at the above-described flow resistance between the air layer and an outside of the air layer. As a result, a spring characteristic and a damping characteristic that are obtained based on the air layer, act to reduce vibration. In addition, air can pass through the ventilation portion of at least one of the plate-like member and the frame that has the air permeability between the air layer having a characteristic for reduction of the sound pressure level and the outside of the air layer. As a result, the spring characteristic and the damping characteristic that are obtained based on the air layer, act to reduce vibration.

According to another aspect of the present invention, an open air layer-type vibration reduction structure includes: at least one plate-like member arranged such that an obverse surface thereof faces an open space; and a frame arranged with an interval from a reverse surface of the plate-like member that opposes the obverse surface of the plate-like member. In the open air layer-type vibration reduction structure, an air layer is formed between the plate-like member and the frame, and ventilation portions are provided to at least one of the plate-like member and the frame such that a sound pressure level generated within the air layer by applying an external force to the air layer is reduced by 3 dB or more in a dominant frequency, in comparison with a case in which the plate-like member and the frame have no air permeability, the dominant frequency being based on characteristics of a series of systems including the plate-like member, the frame, and the air layer. Accordingly, air can pass through the ventilation portion of at least one of the plate-like member and the frame between the air layer having a characteristic of reduction of the sound pressure level and the outside of the air layer. As a result, the spring characteristic and the damping characteristic that are obtained based on the air layer act to reduce vibration.

According to an aspect of the present invention, the open air layer-type vibration reduction structure includes the ventilation portions formed by providing air holes in an entirety of the plate-like member or a part of the plate-like member. Accordingly, air can pass through the plate-like member having the air permeability at the flow resistance or the sound pressure reduction performance between the air layer and the open space. As a result, the spring characteristic and the damping characteristic that are obtained based on the air layer act to reduce vibration.

According to an aspect of the present invention, the open air layer-type vibration reduction structure includes the ventilation portions formed by providing air holes in an entirety of the frame or a part of the frame. Accordingly, air can pass through the frame having the air permeability at the flow resistance or the sound pressure reduction performance between the air layer and the open space. As a result, the spring characteristic and the damping characteristic that are obtained based on the air layer act to reduce vibration.

According to an aspect of the present invention, in the open air layer-type vibration reduction structure, a plurality of the plate-like members is provided, the plurality of plate-like members is arranged adjacent to one another, and the ventilation portions are formed by providing a clearance between the mutually adjacent plate-like members. Accordingly, the plurality of plate-like members are arranged in the same area as the area in which only one plate-like member is arranged in the conventional method. As a result, the mass of the plate-like members in a spring-mass system that includes the respective plate-like members, becomes smaller in comparison with the conventional method in which a vibration insulation structure is including one plate-like member only. An aspect of the present invention can particularly reduce the vibration transmitted from the plate-like member to the frame. In addition, the lowest resonance frequency of each plate-like member moves to a higher frequency band. As a result, the vibration can be reduced with the spring characteristic and the damping characteristic that are obtained based on the air layer in the frequency band of 50 Hz to 300 Hz in which the problems may generally and easily occur, in particular, regarding vibrations transmitted from the plate-like member to the frame. Furthermore, air can pass through the portion in which the plurality of plate-like members having the flow resistance or the sound pressure reduction performance described above is provided, between the air layer and the open space. As a result, the spring characteristic and the damping characteristic that are obtained based on the air layer act to reduce vibration.

According to an aspect of the present invention, the open air layer-type vibration reduction structure further includes a supporting member configured to support the plate-like member and arranged between the plate-like member and the frame. In the open air layer-type vibration reduction structure, the air layer is surrounded by the plate-like member, the frame, and the supporting member, and the supporting member has air permeability. Accordingly, air can pass through the plate-like member having the air permeability at the flow resistance or the sound pressure reduction performance between the air layer and the open space or the external space. As a result, the spring characteristic and the damping characteristic that are obtained based on the air layer act to reduce vibration.

According to an aspect of the present invention, in the open air layer-type vibration reduction structure, a plurality of the plate-like members is provided, the plurality of plate-like members is arranged adjacent to one another, and the adjacent plate-like members are connected to one another by using a vibration insulation material. Accordingly, the plurality of plate-like members are arranged in the same area as the area in which the only plate-like member is arranged in the conventional method. As a result, the mass of the plate-like members in a spring-mass system including the respective plate-like members becomes smaller in comparison with the conventional method in which a vibration insulation structure includes one plate-like member only. In addition, the resonance frequency in the vibration insulation structure can be moved to the frequency band outside the frequency band that problems against vibration control may easily arise. In addition, the plurality of the plate-like members are connected to one another by using the vibration insulation material, and therefore, the transmission of the vibration which may occur among the respective plate-like members to respective adjacent plate-like members, can be prevented. As a result, the increase in the vibration that may occur in the respective plate-like members, which may occur due to the vibration of the adjacent plate-like members, can be prevented. Furthermore, if the dimension, the rigidity, and the like of the respective plate-like members are set differently for different plate-like members, the resonance frequencies of the respective plate-like members differ from one another, and therefore, the resonance frequencies of the respective plate-like members are scattered at various different frequencies. Accordingly, with the above-described configuration, the present invention can further reduce the vibration.

According to an aspect of the present invention, in the open air layer-type vibration reduction structure, the ventilation portion is provided with an acoustically transparent member being arranged in the ventilation portion, the acoustically transparent member having a sound insulation performance of reducing the sound pressure level by 0 to 2 dB in a frequency domain of 30 to 300 Hz. Accordingly, the ventilation portion is covered with the acoustically transparent member that has the only slight sound insulation performance. As a result, the vibration insulation performance, which is achieved due to the flow resistance of at least one of the plate-like member and the frame, and the effect of reducing the sound pressure level in the air layer, does not degrade. The acoustically transparent member described above provides the ventilation portion with the water resistance and the dust resistance. As a result, the present invention can prevent foreign particles from entering the air layer via the ventilation portion. Accordingly, the open air layer-type vibration reduction structure according to the present invention can become more practically useful.

According to an aspect of the present invention, in the open air layer-type vibration reduction structure, a load from the plate-like member toward the frame is applied to a peripheral portion of the plate-like member. Accordingly, the present invention can reduce the vibration that may occur due to the characteristics of the plate-like member.

Advantageous Effects of Invention

According to an aspect of the present invention, the above-described vibration insulation structure can effectively reduce vibration which may occur due to a load, such as an impact, as described below in the following Exemplary Embodiments of the present invention.

BRIEF DESCRIPTION OF DRAWINGS

FIG. 1A is a plan view that illustrates an exemplary open air layer-type vibration reduction structure according to a First Exemplary Embodiment of the present invention. FIG. 1B is a cross section A-A of the example illustrated in FIG. 1A.

DESCRIPTION OF EMBODIMENTS

Figure 2:
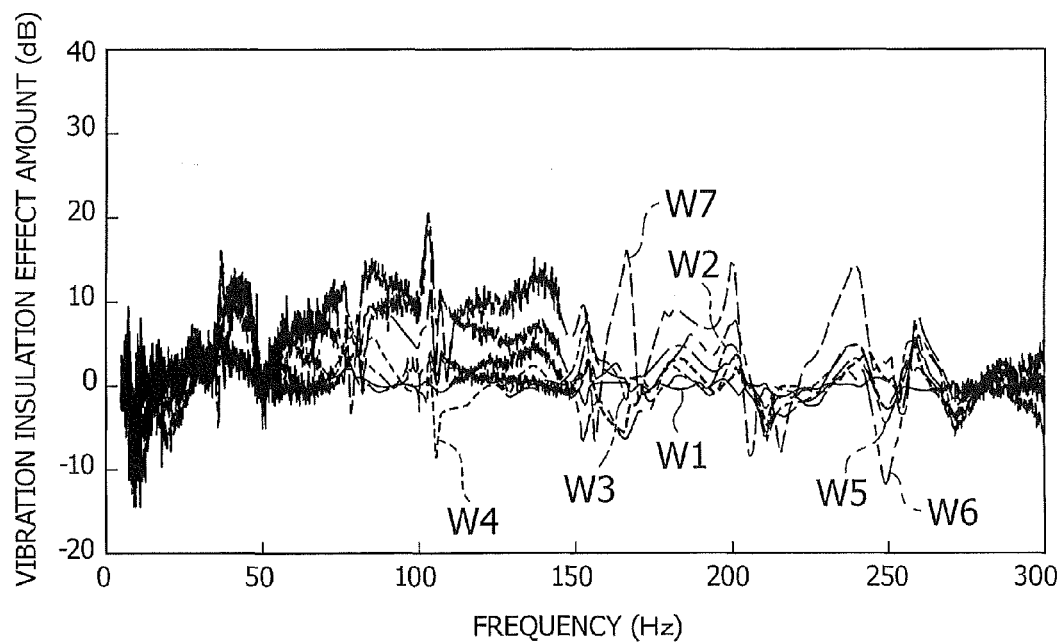
FIG. 2 is a diagram that illustrates a relationship between a vibration insulation effect amount, which is a difference between an average value of vibration acceleration of a frame and an average value of vibration acceleration of a plate-like member, and a frequency according to the First Exemplary Embodiment of the present invention.

An exemplary open air layer-type vibration reduction structure (hereinafter simply referred to as a "vibration reduction structure") according to the First Exemplary Embodiment to the Tenth Exemplary Embodiment of the present invention, will be described in detail below. In each Exemplary Embodiment, a vibration reduction structure provided to a floor installed as an interior of a building will be described. However, the vibration reduction structure according to each Exemplary Embodiment is not limited to this. More specifically, the vibration reduction structure according to each Exemplary Embodiment can be provided to a wall, a ceiling, and the like which are installed to an interior of a building. In addition, the vibration reduction structure can be provided to a floor, a side surface, a ceiling, and the like of an interior of an automobile. Furthermore, the vibration reduction structure can be provided to a surface of a road built outdoors.

First Exemplary Embodiment

A vibration reduction structure according to the First Exemplary Embodiment of the present invention will be described below. Referring to FIG. 1A and FIG. 1B, the vibration reduction structure is provided with a plate-like member 1, which is configured as a floor member. The vibration reduction structure is provided with a frame 2 that is a base for supporting the plate-like member 1. The plate-like member 1 has a rectangular shape and is arranged such that an obverse surface (a top surface) 1a of the plate-like member 1 faces an open air side of an interior. The obverse surface 1a of the plate-like member 1 is configured as a surface of a floor of an interior. The frame 2 having a concave shape is provided with an opening 2a that opens on the side of the open space of the interior. The plate-like member 1 is configured to be fitted into the opening 2a of the frame 2 described above. A reverse surface 1b of the plate-like member 1 and a bottom surface 2b of the frame 2 are arranged with a clearance. In addition, an air layer 3 that is surrounded by the reverse surface (an underside surface) 1b of the plate-like member 1, the bottom surface 2b, and a side wall surface 2c of the frame 2, is formed between the plate-like member 1 and the frame 2. A vibration proof rubber 4 is arranged on the bottom surface 2b of the frame 2 so as to correspond to each corner portion of the plate-like member 1. The plate-like member 1 is supported by the vibration proof rubber 4. A peripheral portion 1c of the plate-like member 1 and the side wall surface 2c of the frame 2 are in contact with each other, or are arranged in proximity to each other. The plate-like member 1 can move toward the open space side and the side of the air layer 3 in relation to the frame 2.

A plurality of air holes 1d is formed on the entirety of the plate-like member 1 as ventilation portions that communicate through the open space and the air layer 3. The air hole 1d penetrates through the plate-like member 1. In this case, the shape, the dimension, the quantity, and the like of the air hole 1d are determined such that an average value of the flow resistance (flow resistance) on the surface of the plate-like member 1 that forms the air layer 3, is in the range greater than 0 N·s/m$^3$ and equal to or less than 1,000 N·s/m$^3$.

In the present exemplary embodiment, the lower limit of the average value of the flow resistance is determined as follows. If the plate-like member 1 is not provided, the average value of the flow resistance becomes 0 N·s/m$^3$. However, it is a premise in the present exemplary embodiment that the plate-like member 1 is provided, and therefore, it is necessary that the average value of the flow resistance assumed in the vibration reduction structure be greater than 0 N·s/m$^3$. Therefore, the lower limit of the average value of the above-described flow resistance is designed to be greater than 0 N·s/m$^3$.

Figure 3:
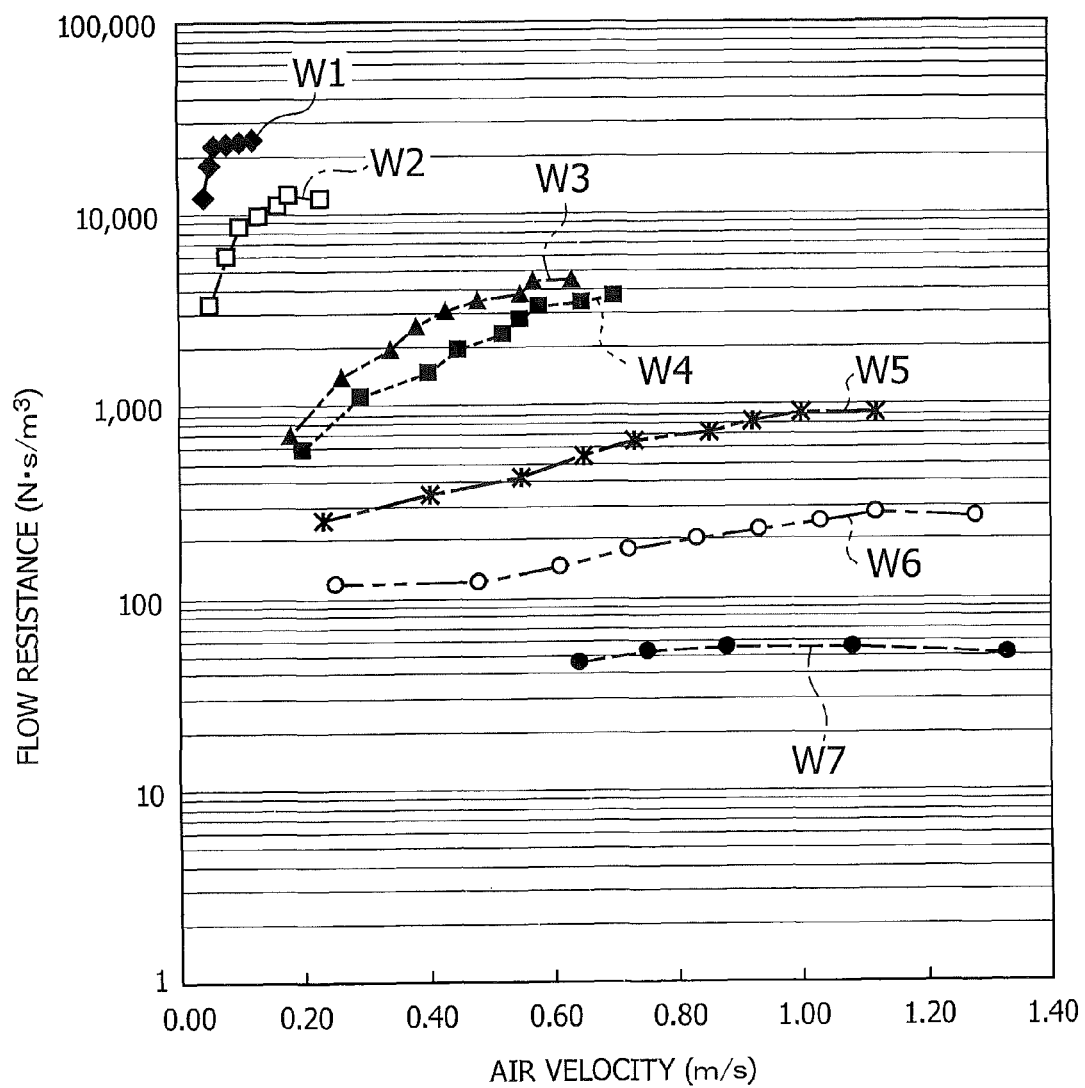
FIG. 3 is a diagram that illustrates a relationship between an air velocity of air, which transmits through an obverse surface and a reverse surface of the plate-like member, and a flow resistance of the plate-like member according to the First Exemplary Embodiment of the present invention.

On the other hand, the upper limit of the average value of the flow resistance is determined as follows. FIG. 2 shows a relationship between a vibration insulation effect amount and a frequency, when changing an open area ratio that is a ratio of the total area of all the air holes 1d on the obverse surface 1a or the reverse surface 1b of the plate-like member 1 relative to the area of the obverse surface 1a or the reverse surface 1b of the plate-like member 1. Note that the vibration insulation effect amount is a difference between an average value of vibration acceleration of the frame 2 and an average value of vibration acceleration of the plate-like member 1 (=(average value of vibration acceleration of the frame)−(average value of vibration acceleration of the floor member)). In the example illustrated in FIG. 2, a solid line W1 corresponds to a case in which the open area ratio is 0.18%; alternate long and short dashed lines W2 correspond to a case in which the open area ratio is 0.36%; chain double-dashed lines W3 correspond to a case in which the open area ratio is 0.73%; a dotted line W4 corresponds to a case in which the open area ratio is 1.46%; alternate long and short dashed lines W5 correspond to a case in which the open area ratio is 2.92% (the alternate long and short dashed lines W5 have an interval between long and short dashed lines wider than that of the alternate long and short dashed lines W2); chain double-dashed lines W6 correspond to a case in which the open area ratio is 5.83% (the chain double-dashed lines W6 have an interval between chain double-dashed lines wider than that of the chain double-dashed lines W3); and a broken line W7 corresponds to a case in which the open area ratio is 14.58%. With reference to FIG. 2, it can be known that when the open area ratio becomes equal to or greater than 0.73%, the vibration reduction effect can be obtained in the normal mode of vibration occurring due to the characteristic of the plate-like member 1, in particular, such as the primary normal mode of vibration of the plate-like member 1 (approximately 40 Hz in the example illustrated in FIG. 2); and the secondary normal mode of vibration of the plate-like member 1 (approximately 80 Hz in the example illustrated in FIG. 2). In this regard, a relationship between the open area ratio and the flow resistance is verified as follows. FIG. 3 shows results of the verification of the relationship between the air velocity and the flow resistance for the respective plate-like member having respective open area ratio. Note that the result is obtained when air is fed between the obverse surface 1a and the reverse surface 1b of the plate-like member 1 that has the respective open area ratio described above at varied air velocity. In the example illustrated in FIG. 3, similarly to the example illustrated in FIG. 2, a solid line W1 corresponds to a case in which the open area ratio is 0.18%; alternate long and short dashed lines W2 correspond to a case in which the open area ratio is 0.36%; chain double-dashed lines W3 correspond to a case in which the open area ratio is 0.73%; a dotted line w4 corresponds to a case in which the open area ratio is 1.46%; alternate long and short dashed lines W5 correspond to a case in which the open area ratio is 2.92% (the alternate long and short dashed lines W5 have an interval between long and short dashed lines wider than that of the alternate long and short dashed lines W2); chain double-dashed lines W6 correspond to a case in which the open area ratio is 5.83% (the chain double-dashed lines W6 have an interval between chain double-dashed lines wider than that of the chain double-dashed lines W3); and a broken line W7 corresponds to a case in which the open area ratio is 14.58%. The air velocity of the air that actually flows between the obverse surface 1a and the reverse surface 1b of the plate-like member 1 is 0 m/s to 0.2 m/s, and therefore, it can be observed that the average value of the flow resistance becomes steadily equal to or less than 1,000 N·s/m$^3$. Therefore, it can be observed that it is useful when the upper limit of the average value of the flow resistance described above is equal to or less than 1,000 N·s/m$^3$.

Alternatively, in the present exemplary embodiment, the shape, the dimension, the quantity, and the like of the air hole 1d are determined such that the sound pressure level generated within the air layer 3 by applying an external force to the air layer 3 is reduced by 3 dB or more in a dominant frequency (approximately 40 Hz, 80 Hz, or the like in the example illustrated in FIG. 2), in comparison with a case in which the plate-like member 1 has no air permeability. Note that the dominant frequency is based on characteristics of a series of systems consisting of the plate-like member 1, the frame 2, and the air layer 3.

Figure 4:
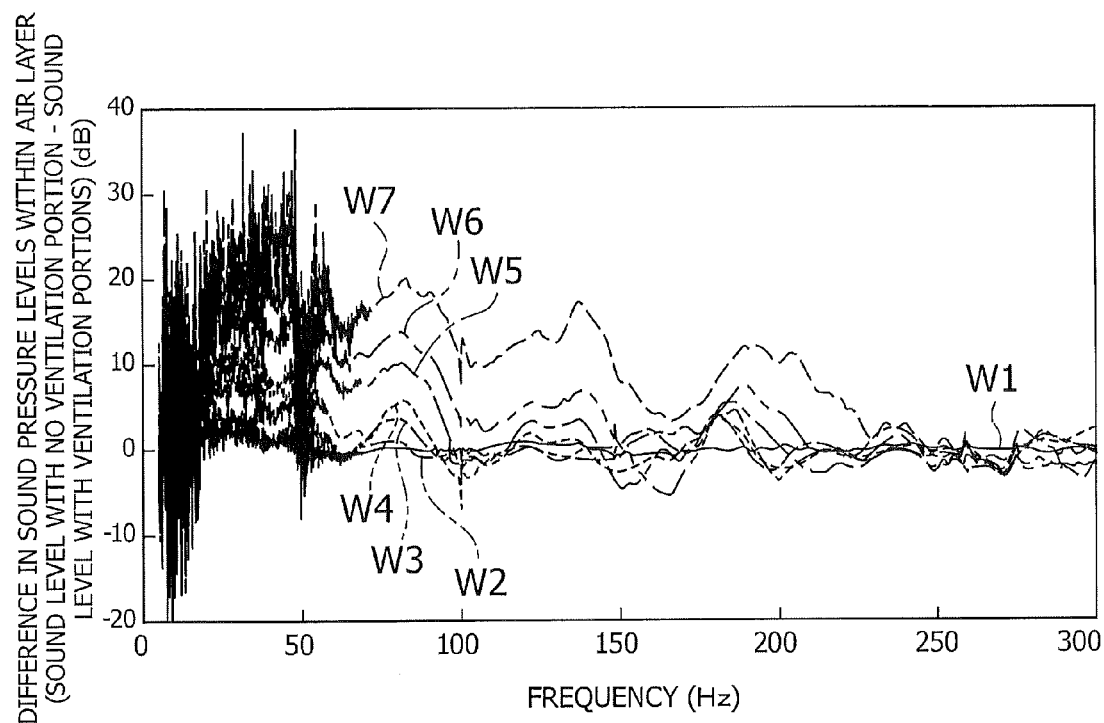
FIG. 4 is a diagram that illustrates a relationship between a difference between a sound pressure level in an air layer applied if an external force is applied to a vibration reduction structure that uses a plate-like member that has no air permeability and a sound pressure level applied if an external force is applied to a vibration reduction structure that uses a plate-like member that has air holes and a frequency according to the First Exemplary Embodiment of the present invention.

This is determined as follows. As described above, in FIG. 2, it can be observed that the vibration reduction effect can be obtained at the dominant frequency based on characteristics of a series of systems consisting of the plate-like member 1, the frame 2, and the air layer 3, in particular, such as at approximately 40 Hz and approximately 80 Hz, in a state in which the open area ratio is equal to or greater than 0.73%. In this regard, a relationship between the open area ratio and the sound pressure level is verified as follows. FIG. 4 shows results of a relationship between a difference between the sound pressure levels and a frequency. Note that the results are obtained by subtracting the sound pressure level applied when an external force is applied to a vibration reduction structure that uses the plate-like member 1 having the respective open area ratios described above, from the sound pressure level within the air layer 3 applied when an external force is applied to a vibration reduction structure that uses a plate-like member having no air permeability. In the example illustrated in FIG. 4, similarly to the example illustrated in FIG. 2, a solid line W1 corresponds to a case in which the open area ratio is 0.18%; alternate long and short dashed lines W2 correspond to a case in which the open area ratio is 0.36%; chain double-dashed lines W3 correspond to a case in which the open area ratio is 0.73%; a dotted line W4 corresponds to a case in which the open area ratio is 1.46%; alternate long and short dashed lines W5 correspond to a case in which the open area ratio is 2.92% (the alternate long and short dashed lines W5 have an interval between long and short dashed lines wider than that of the alternate long and short dashed lines W2); chain double-dashed lines W6 correspond to a case in which the open area ratio is 5.83% (the chain double-dashed lines W6 have an interval between chain double-dashed lines wider than that of the chain double-dashed lines W3); and a broken line W7 corresponds to a case in which the open area ratio is 14.58%. In the example illustrated in FIG. 4, it can be observed that when the open area ratio is equal to or greater than 0.73%, 3 dB or more of the difference between the sound pressure levels described above is obtained at approximately 40 Hz and 80 Hz of dominant frequencies based on characteristics of a series of systems consisting of the plate-like member 1, the frame 2, and the air layer 3. Note that the upper limit of the sound pressure level to be reduced described above will not be described, because the upper limit of the sound pressure level to be reduced becomes the very sound pressure level obtained if the plate-like member 1 has no air permeability.

In the present Exemplary Embodiment, the shape, the dimension, the quantity, and the like of the air hole 1d can be determined as follows. The average value of the flow resistance on the surface of the plate-like member 1 that forms the air layer 3, is in the range greater than 0 N·s/m$^3$ and equal to or less than 1,000 N·s/m$^3$; and the sound pressure level generated within the air layer 3 by applying an external force to the air layer 3, is reduced by 3 dB or more in a dominant frequency, in comparison with a case in which the plate-like member 1 has no air permeability, Note that the dominant frequency is based on characteristics of a series of systems consisting of the plate-like member 1, the frame 2, and the air layer 3.

As described above, according to the present Exemplary Embodiment, air can pass through the air hole 1d of the plate-like member 1 that has the air permeability at the above-described flow resistance between the air layer 3 and the outside of the air layer 3. As a result, the spring characteristic and the damping characteristic that are obtained based on the air layer 3, act to reduce vibration. Accordingly, the vibration that may occur due to a load, such as an impact, can be effectively reduced.

According to the present Exemplary Embodiment, air can pass through the air hole 1d of the plate-like member 1 between the air layer 3 that has a characteristic of reducing the sound pressure level and the outside of the air layer 3. As a result, the spring characteristic and the damping characteristic that are obtained based on the air layer 3, act to reduce vibration. Accordingly, the vibration that may occur due to a load, such as an impact, can be effectively reduced.

Second Exemplary Embodiment

A vibration reduction structure according to the Second Exemplary Embodiment of the present invention will be described below. A vibration reduction structure according to the present Exemplary Embodiment has a configuration similar to that of the vibration reduction structure according to the First Exemplary Embodiment. Components of the present Exemplary Embodiment similar to those of the First Exemplary Embodiment are provided with the same reference numerals, symbols, and names of those of the vibration reduction structure according to the First Exemplary Embodiment. Hereinbelow, the configuration different from that of the First Exemplary Embodiment only will be described.

Figure 5:
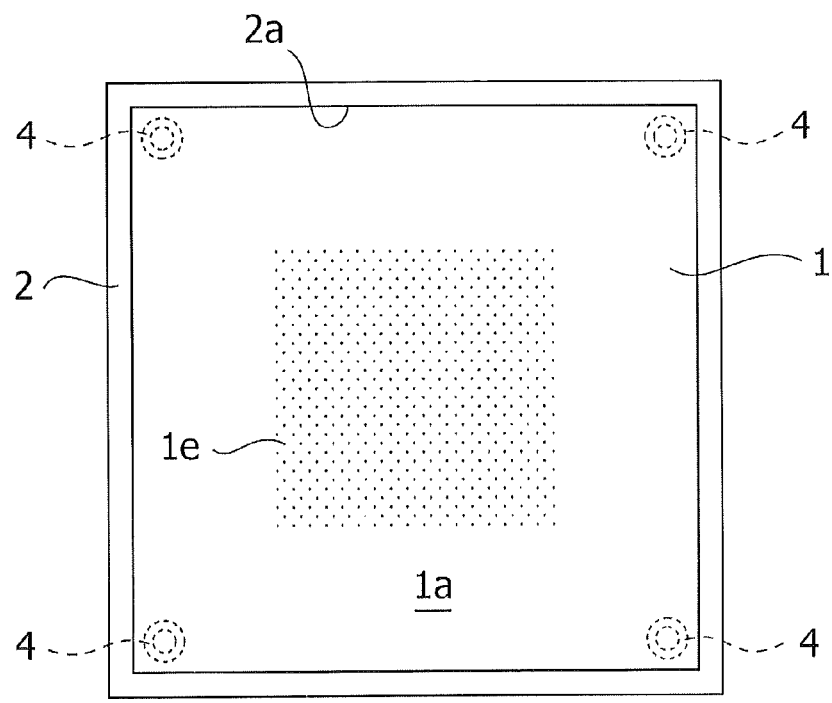
FIG. 5 is a plan view that illustrates an exemplary open air layer-type vibration reduction structure according to a Second Exemplary Embodiment of the present invention.

Referring to FIG. 5, the vibration reduction structure according to the present Exemplary Embodiment is provided with a plurality of air holes 1e that are provided in the center of the plate-like member 1 as ventilation portions that communicate through the open space and the air layer 3. The air holes 1e penetrate through the plate-like member 1. In this case, similarly to the first exemplary embodiment, the shape, the dimension, the quantity, and the like of the air hole 1e are determined such that the average value of the flow resistance on the surface of the plate-like member 1 that forms the air layer 3, is in the range greater than 0 N·s/m$^3$ and equal to or less than 1,000 N·s/m$^3$.

In addition, similarly to the First Exemplary Embodiment, the shape, the dimension, the quantity, and the like of the air hole 1e can be determined such that the sound pressure level generated within the air layer 3 by applying an external force to the air layer 3, is reduced by 3 dB or more in a dominant frequency, in comparison with a case in which the plate-like member 1 has no air permeability. Note that the dominant frequency is based on characteristics of a series of systems consisting of the plate-like member 1, the frame 2, and the air layer 3.

Similarly to the First Exemplary Embodiment, the shape, the dimension, the quantity, and the like of the air hole 1e can be determined such that: the average value of the flow resistance on the surface of the plate-like member 1 that forms the air layer 3, is in the range greater than 0 N·s/m$^3$ and equal to or less than 1,000 N·s/m$^3$; and the sound pressure level generated within the air layer 3 by applying an external force to the air layer 3, is reduced by 3 dB or more in a dominant frequency, in comparison with a case in which the plate-like member 1 has no air permeability. Note that the dominant frequency is based on characteristics of a series of systems consisting of the plate-like member 1, the frame 2, and the air layer 3.

As described above, according to the present Exemplary Embodiment, the same effect as that of the First Exemplary Embodiment can be achieved.

Third Exemplary Embodiment

A vibration reduction structure according to the Third Exemplary Embodiment of the present invention will be described below. A vibration reduction structure according to the present Exemplary Embodiment has a configuration similar to that of the vibration reduction structure according to the First Exemplary Embodiment. Components of the present Exemplary Embodiment similar to those of the First Exemplary Embodiment are provided with the same reference numerals, symbols, and names of those of the vibration reduction structure according to the First Exemplary Embodiment. Hereinbelow, the configuration different from that of the First Exemplary Embodiment only will be described.

Figure 6:
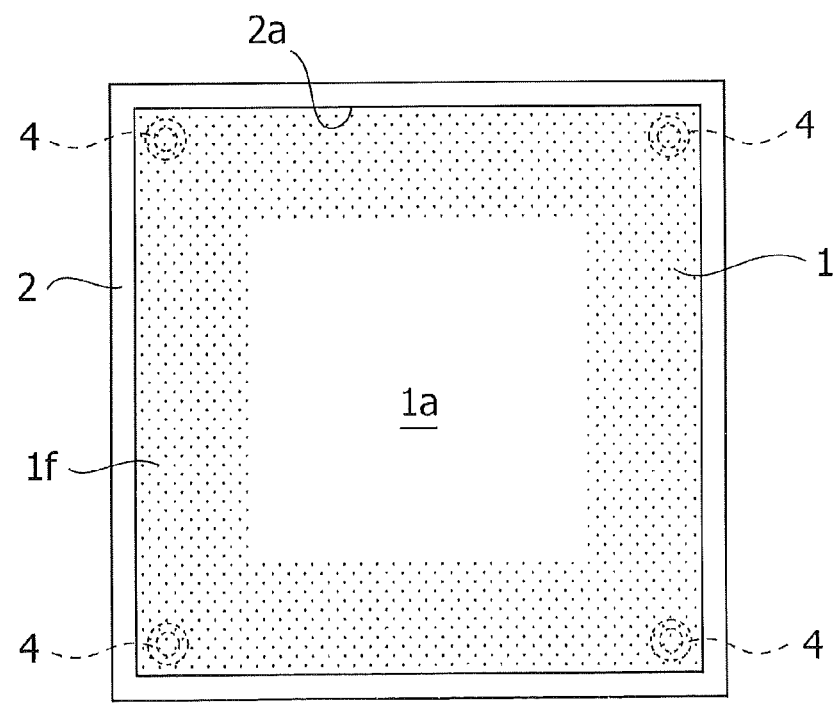
FIG. 6 is a plan view that illustrates an exemplary open air layer-type vibration reduction structure according to a Third Exemplary Embodiment of the present invention.

Referring to FIG. 6, the vibration reduction structure according to the present Exemplary Embodiment is provided with a plurality of air holes 1f, which is provided on the peripheral portion of the plate-like member 1 as ventilation portions that communicate through the open space and the air layer 3. The air holes 1f penetrate through the plate-like member 1. In this case, similarly to the First Exemplary Embodiment, the shape, the dimension, the quantity, and the like of the air hole 1f are determined such that the average value of the flow resistance on the surface of the plate-like member 1 that forms the air layer 3, is in the range greater than 0 N·s/m$^3$ and equal to or less than 1,000 N·s/m$^3$.

Similarly to the First Exemplary Embodiment, the shape, the dimension, the quantity, and the like of the air hole 1f can be determined such that the sound pressure level generated within the air layer 3 by applying an external force to the air layer 3, is reduced by 3 dB or more in a dominant frequency, in comparison with a case in which the plate-like member 1 has no air permeability. Note that the dominant frequency is based on characteristics of a series of systems consisting of the plate-like member 1, the frame 2, and the air layer 3.

Similarly to the First Exemplary Embodiment, the shape, the dimension, the quantity, and the like of the air hole 1f can be determined such that: the average value of the flow resistance on the surface of the plate-like member 1 that forms the air layer 3, is in the range greater than 0 N·s/m$^3$ and equal to or less than 1,000 N·s/m$^3$; and the sound pressure level generated within the air layer 3 by applying an external force to the air layer 3 is reduced by 3 dB or more in a dominant frequency, in comparison with a case in which the plate-like member 1 has no air permeability. Note that the dominant frequency is based on characteristics of a series of systems consisting of the plate-like member 1, the frame 2, and the air layer 3.

As described above, according to the present Exemplary Embodiment, the same effect as that of the First Exemplary Embodiment can be achieved.

Fourth Exemplary Embodiment

Figure 7A:
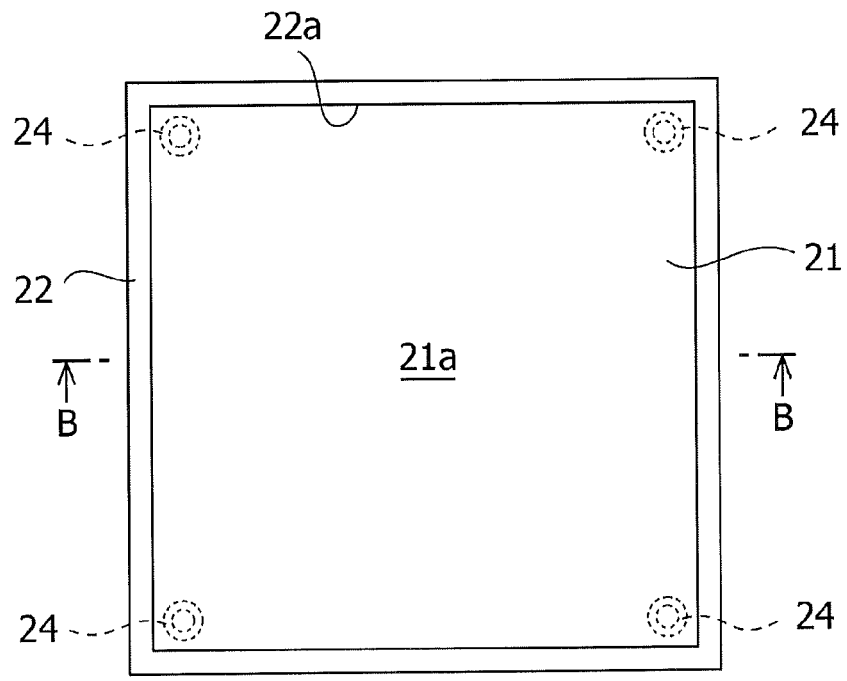
FIG. 7A is a plan view that illustrates an exemplary open air layer-type vibration reduction structure according to a Fourth Exemplary Embodiment of the present invention.
Figure 7B:
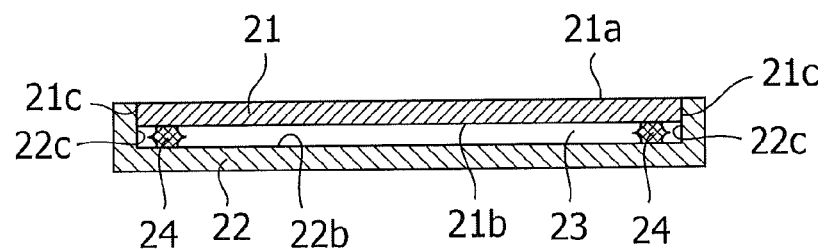
FIG. 7B is a cross section B-B of the example illustrated in FIG. 7A.
Figure 8:
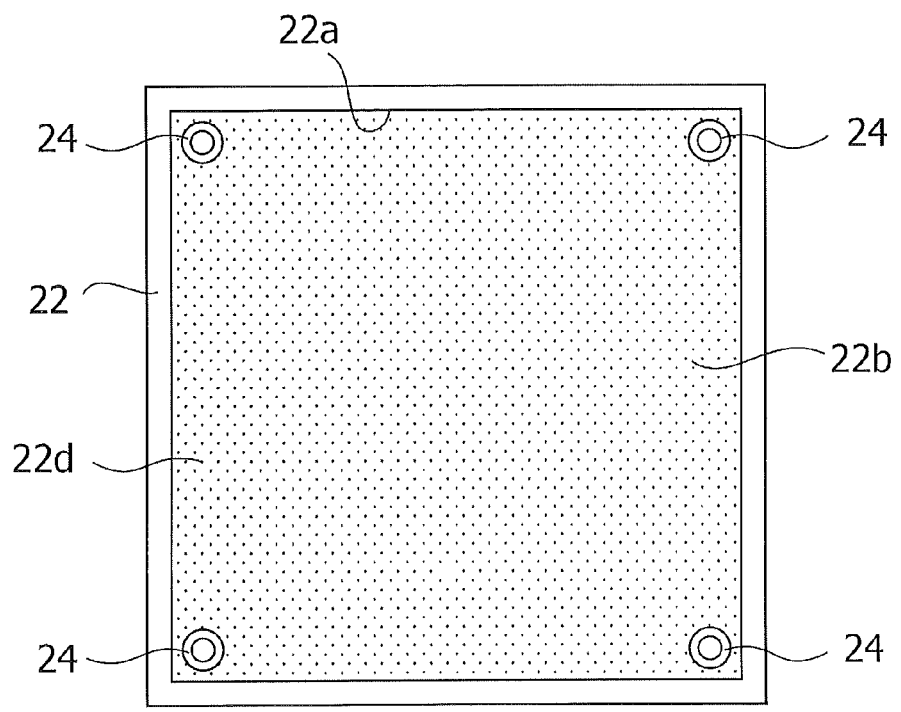
FIG. 8 is a plan view that illustrates an exemplary open air layer-type vibration reduction structure according to the Fourth Exemplary Embodiment of the present invention in which a plate-like member is omitted.

A vibration reduction structure according to the Fourth Exemplary Embodiment of the present invention will be described below. Referring to FIG. 7A, FIG. 7B, and FIG. 8, the vibration reduction structure is provided with a plate-like member 21 that is configured as a floor member. In addition, the vibration reduction structure is provided with a frame 22 that is a base for supporting the plate-like member 21. The plate-like member 21 has a rectangular shape and is arranged such that an obverse surface 21a thereof faces an open air side of an interior. The obverse surface 21a of the plate-like member 21 is configured as a surface of a floor of an interior. The frame 22 having a concave shape, is provided with an opening 22a that opens on the side of the open space of the interior. The plate-like member 21 is configured to be fitted into the opening 22a of the frame 22. A reverse surface 21b of the plate-like member 21 and a bottom surface 22b of the frame 22 are arranged with a clearance. In addition, an air layer 23 surrounded by the reverse surface 21b of the plate-like member 21 and the bottom surface 22b and a side wall surface 22c of the frame 22, is formed between the plate-like member 21 and the frame 22. A vibration proof rubber 24 is arranged on the bottom surface 22b of the frame 22 corresponding to each corner portion of the plate-like member 21. The plate-like member 21 is supported by the vibration proof rubber 24. A peripheral portion 21c of the plate-like member 21, and the side wall surface 22c of the frame 22 are in contact with each other or are arranged in proximity to each other. The plate-like member 21 can move toward the open space side and the side of the air layer 23 in relation to the frame 22.

As illustrated in FIG. 8, a plurality of air holes 22d is formed on the entirety of the frame 22 as ventilation portions that communicate through the air layer 23 and an external space. In addition, the air hole 22d penetrates through the frame 22. In this case, similarly to the plate-like member 1 of the First Exemplary Embodiment, the shape, the dimension, the quantity, and the like of the air hole 22d are determined such that an average value of the flow resistance on the surface of the frame 22 that forms the air layer 23, is in the range greater than 0 N·s/m$^3$ and equal to or less than 1,000 N·s/m$^3$.

Similarly to the plate-like member 1 of the First Exemplary Embodiment, the shape, the dimension, the quantity, and the like of the air hole 22d can be determined such that the sound pressure level generated within the air layer 23 by applying an external force to the air layer 23, is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

Similarly to the plate-like member 1 of the First Exemplary Embodiment, the shape, the dimension, the quantity, and the like of the air hole 22d can be determined such that: the average value of the flow resistance on the surface of the frame 22 that forms the air layer 23, is in the range greater than 0 N·s/m$^3$ and equal to or less than 1,000 N·s/m$^3$; and the sound pressure level generated within the air layer 23 by applying an external force to the air layer 23, is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

As described above, according to the present Exemplary Embodiment, air can pass through the air hole 22d of the frame 22 that has the air permeability at the above-described flow resistance between the air layer 23 and the outside of the air layer 23. As a result, the spring characteristic and the damping characteristic that are obtained based on the air layer 23, act to reduce vibration. Accordingly, the vibration that may occur due to a load, such as an impact, can be effectively reduced.

According to the present Exemplary Embodiment, air can pass through the air hole 22d of the frame 22, which has the air permeability, between the air layer 23 that has a characteristic of reducing the sound pressure level and the outside of the air layer 23. As a result, the spring characteristic and the damping characteristic that are obtained based on the air layer 23, act to reduce vibration. Accordingly, the vibration that may occur due to a load, such as an impact, can be effectively reduced.

Fifth Exemplary Embodiment

A vibration reduction structure according to the Fifth Exemplary Embodiment of the present invention will be described below. A vibration reduction structure according to the present Exemplary Embodiment has a configuration similar to that of the vibration reduction structure according to the Fourth Exemplary Embodiment. Components of the present Exemplary Embodiment similar to those of the Fourth Exemplary Embodiment are provided with the same reference numerals, symbols, and names of those of the vibration reduction structure according to the Fourth Exemplary Embodiment. Hereinbelow, the configuration different from that of the Fourth Exemplary Embodiment only will be described.

Figure 9:
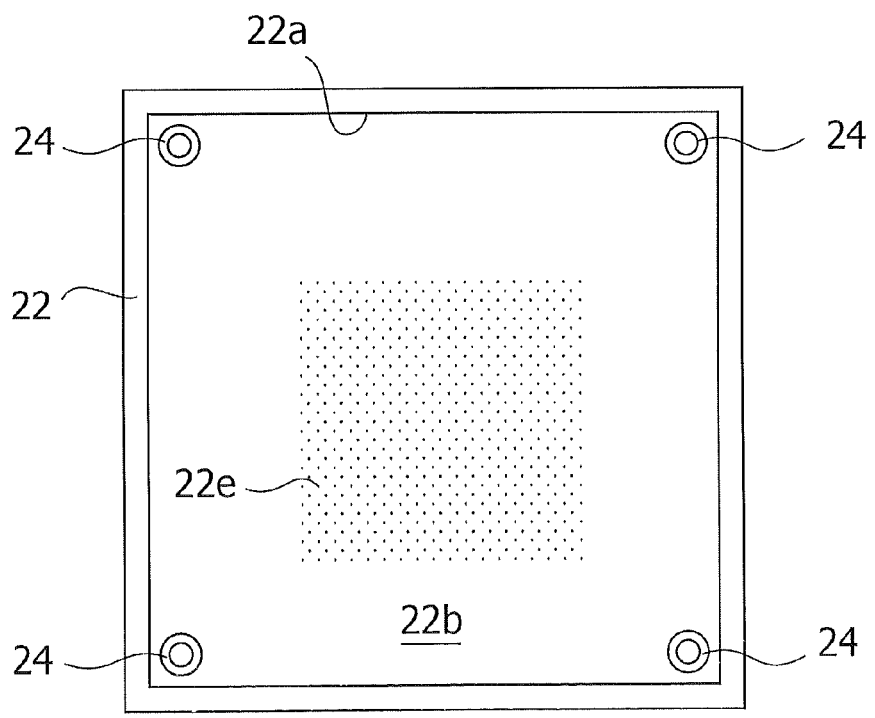
FIG. 9 is a plan view that illustrates an exemplary open air layer-type vibration reduction structure according to a Fifth Exemplary Embodiment of the present invention in which a plate-like member is omitted.

Referring to FIG. 9, a plurality of air holes 22e is provided in the center of the frame 22 as ventilation portions that communicate through the air layer 23 and the external space. The air holes 22e penetrate through the frame 22. In this case, similarly to the plate-like member 1 of the First Exemplary Embodiment, the shape, the dimension, the quantity, and the like of the air hole 22e are determined such that the average value of the flow resistance on the surface of the frame 22 that forms the air layer 23, is in the range greater than $0 \text{ N·s/m}^3$ and equal to or less than $1,000 \text{ N·s/m}^3$.

Similarly to the plate-like member 1 of the First Exemplary Embodiment, the shape, the dimension, the quantity, and the like of the air hole 22e can be determined such that the sound pressure level generated within the air layer 23 by applying an external force to the air layer 23 is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

Similarly to the plate-like member 1 of the First Exemplary Embodiment, the shape, the dimension, the quantity, and the like of the air hole 22e can be determined such that: the average value of the flow resistance on the surface of the frame 22 that forms the air layer 23 is in the range greater than $0 \text{ N·s/m}^3$ and equal to or less than $1,000 \text{ N·s/m}^3$; and the sound pressure level generated within the air layer 23 by applying an external force to the air layer 23 is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

As described above, according to the present Exemplary Embodiment, the same effect as that of the Fourth Exemplary Embodiment can be achieved.

Sixth Exemplary Embodiment

A vibration reduction structure according to the Sixth Exemplary Embodiment of the present invention will be described below. A vibration reduction structure according to the present Exemplary Embodiment has a configuration similar to that of the vibration reduction structure according to the Fourth Exemplary Embodiment. Components of the present Exemplary Embodiment similar to those of the Fourth Exemplary Embodiment are provided with the same reference numerals, symbols, and names of those of the vibration reduction structure according to the Fourth Exemplary Embodiment. Hereinbelow, the configuration different from that of the Fourth Exemplary Embodiment only will be described.

Figure 10:
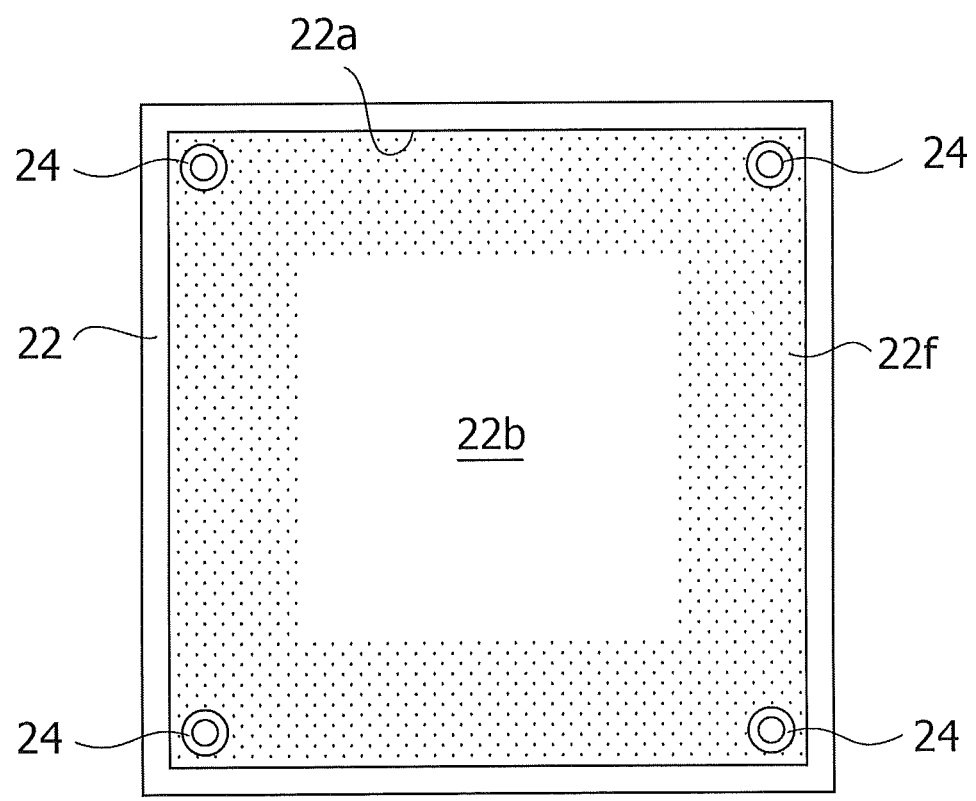
FIG. 10 is a plan view that illustrates an exemplary open air layer-type vibration reduction structure according to a Sixth Exemplary Embodiment of the present invention in which a plate-like member is omitted.

Referring to FIG. 10, a plurality of air holes 22f, which communicates through the air layer 23 and the external space, is provided on a peripheral portion of the frame 22. The air holes 22f penetrate through the frame 22. In this case, similarly to the plate-like member 1 of the First Exemplary Embodiment, the shape, the dimension, the quantity, and the like of the air hole 22f are determined such that the average value of the flow resistance on the surface of the frame 22 that forms the air layer 23, is in the range greater than $0 \text{ N·s/m}^3$ and equal to or less than $1,000 \text{ N·s/m}^3$.

Similarly to the plate-like member 1 of the First Exemplary Embodiment, the shape, the dimension, the quantity, and the like of the air hole 22f can be determined such that the sound pressure level generated within the air layer 23 by applying an external force to the air layer 23 is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

Similarly to the plate-like member 1 of the First Exemplary Embodiment, the shape, the dimension, the quantity, and the like of the air hole 22f can be determined such that: the average value of the flow resistance on the surface of the frame 22 that forms the air layer 23, is in the range greater than $0 \text{ N·s/m}^3$ and equal to or less than $1,000 \text{ N·s/m}^3$; and the sound pressure level generated within the air layer 23 by applying an external force to the air layer 23 is reduced by 3 dB or more in a dominant frequency, in comparison with a case in which the frame 22 has no air permeability. Note that the dominant frequency is based on characteristics of a series of systems consisting of the plate-like member 21, the frame 22, and the air layer 23.

As described above, according to the present Exemplary Embodiment, the same effect as that of the Fourth Exemplary Embodiment can be achieved.

Seventh Exemplary Embodiment

Figure 11A:
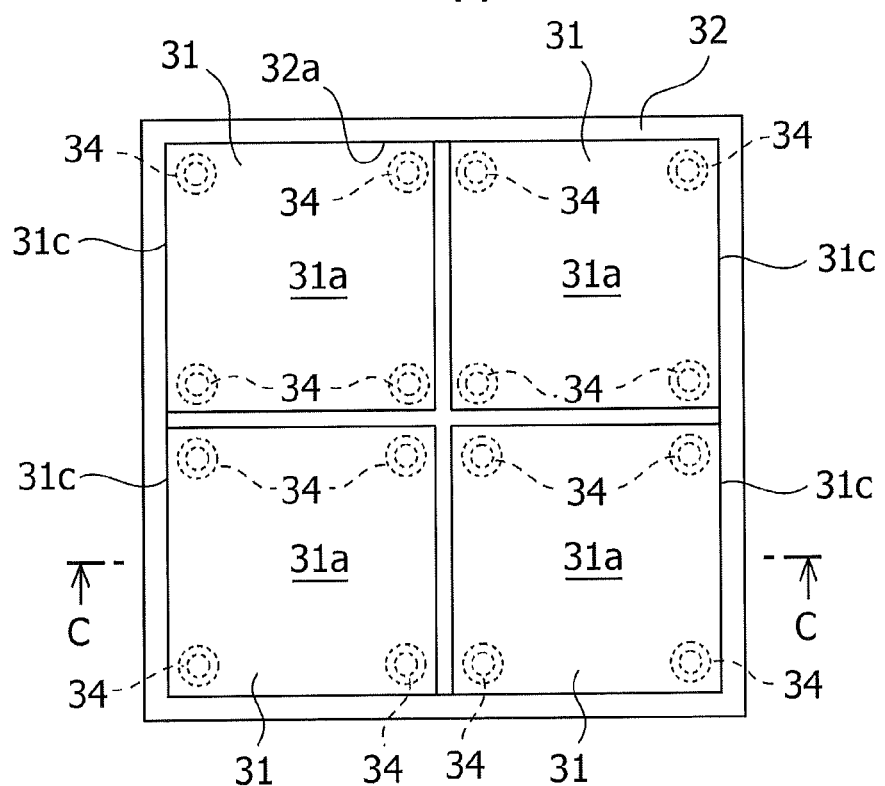
FIG. 11A is a plan view that illustrates an exemplary open air layer-type vibration reduction structure according to a Seventh Exemplary Embodiment of the present invention.
Figure 11B:
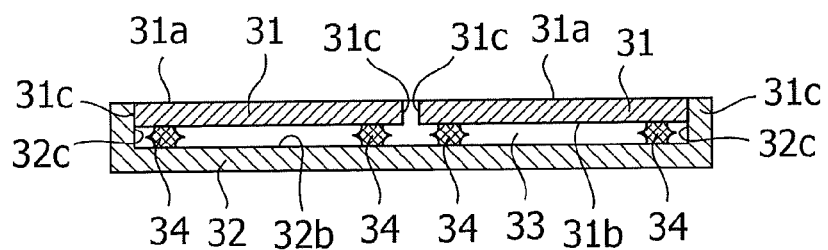
FIG. 11B is a cross section C-C of the example illustrated in FIG. 11A.

A vibration reduction structure according to the Seventh Exemplary Embodiment of the present invention will be described below. Referring to FIG. 11A and FIG. 11B, the vibration reduction structure is provided with a plate-like member 31 that is configured as a floor member. In this case, four plate-like members 31 are provided as an exemplary configuration. However, the configuration of the present Exemplary Embodiment is not limited to this. More specifically, two or more plate-like members 31 can be provided. In addition, the vibration reduction structure is provided with a frame 32 that is a base for supporting the plate-like member 31. The plate-like member 31 has a rectangular shape and the area of respective plate-like members 31 are the same as one another. The plate-like member 31 is arranged such that an obverse surface 31a of which faces an open air side of an interior. The obverse surface 31a of the plate-like member 31 is configured as a surface of a floor of an interior. The four plate-like members 31 are arranged in a 2×2 matrix. The frame 32 having a concave shape, is provided with an opening 32a that opens on the side of the open space of the interior. The plate-like members 31 arranged in the above-described matrix, is configured to be fitted into the opening 32a of the frame 32. A reverse surface 31b of the plate-like member 31 and a bottom surface 32b of the frame 32 are arranged with a clearance. In addition, an air layer 33 surrounded by the reverse surface 31b of the plate-like member 31, and the bottom surface 32b and a side wall surface 32c of the frame 32, is formed between the plate-like member 31 and the frame 32. A vibration proof rubber 34 is arranged on the bottom surface 32b of the frame 32 so as to correspond to each corner portion of the plate-like member 31. The plate-like member 31 is supported by the vibration proof rubber 34. A peripheral portion 31c of the plate-like member 31 and the side wall surface 32c of the frame 32 are in contact with each other, or are arranged in proximity to each other. The plate-like member 31 can move toward the open space side and the side of the air layer 33 in relation to the frame 32.

A clearance is formed between the peripheral portions 31c of the plate-like member 31 provided adjacent to each other. In this case, similarly to the First Exemplary Embodiment, the clearance between the mutually adjacent peripheral portions 31c of the plate-like member 31 is formed such that an average value of the flow resistance on the surface of the plate-like member 31 that forms the air layer 33, is in the range greater than 0 N·s/m$^3$ and equal to or less than 1,000 N·s/m$^3$.

Similarly to the First Exemplary Embodiment, the clearance between the mutually adjacent peripheral portions 31c of the plate-like member 31 is formed such that the sound pressure level generated within the air layer 33 by applying an external force to the air layer 33, is reduced by 3 dB or more in a dominant frequency, in comparison with a case in which the plate-like member 31 has no air permeability. Note that the dominant frequency is based on characteristics of a series of systems consisting of the plate-like member 31, the frame 32, and the air layer 33.

Similarly to the First Exemplary Embodiment, the clearance between the mutually adjacent peripheral portions 31c of the plate-like member 31 is formed such that: the average value of the flow resistance on the surface of the plate-like member 31 which forms the air layer 33, is in the range greater than 0 N·s/m$^3$ and equal to or less than 1,000 N·s/m$^3$, and the sound pressure level generated within the air layer 33 by applying an external force to the air layer 33 is reduced by 3 dB or more in a dominant frequency, in comparison with a case in which the plate-like member 31 has no air permeability. Note that the dominant frequency is based on characteristics of a series of systems consisting of the plate-like member 31, the frame 32, and the air layer 33.

As described above, according to the present Exemplary Embodiment, the plurality of plate-like members 31 is arranged in the same area as the area in which the only plate-like member is arranged in the conventional method. As a result, the mass of the plate-like members 31 in a spring-mass system constituted by the respective plate-like members 31, becomes smaller in comparison with the conventional method in which a vibration reduction structure is constituted by one plate-like member only. Accordingly, the present Exemplary Embodiment can particularly reduce the vibration transmitted from the plate-like member 31 to the frame 32. In addition, the lowest resonance frequency of each plate-like member 31 moves to a higher frequency band. As a result, the vibration can be reduced with the spring characteristic and the damping characteristic obtained due to the air layer 33 in the frequency band of 50 Hz to 300 Hz in which the problems may generally and easily occur, in particular, regarding vibrations transmitted from the plate-like member 31 to the frame 32. In addition, air can pass through the clearance that has the flow resistance or the sound pressure reduction performance described above, between the air layer 33 and the open space. As a result, the spring characteristic and the damping characteristic that are obtained based on the air layer 33 act to reduce vibration. Accordingly, the vibration that may occur due to a load, such as an impact, can be effectively reduced.

Eighth Exemplary Embodiment

Figure 12A:
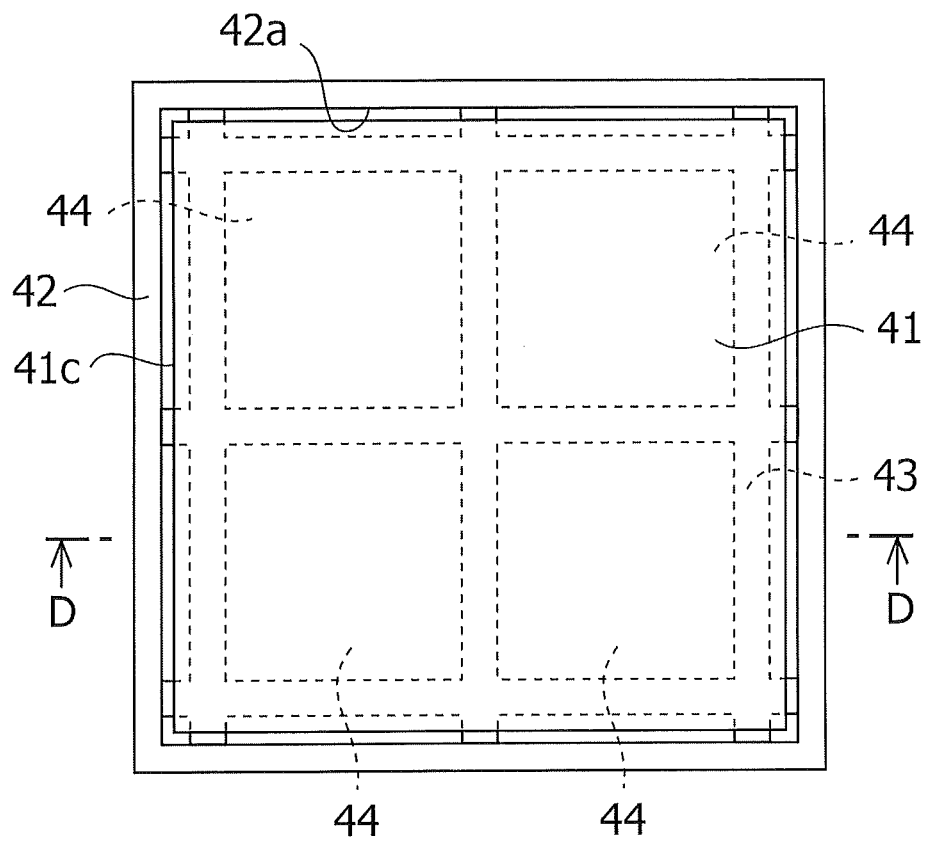
FIG. 12A is a plan view that illustrates an exemplary open air layer-type vibration reduction structure according to an Eighth Exemplary Embodiment of the present invention.
Figure 12B:
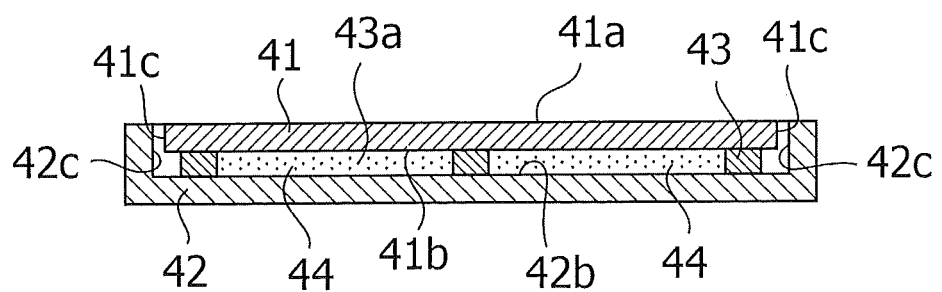
FIG. 12B is a cross section D-D of the example illustrated in FIG. 12A.

A vibration reduction structure according to the Eighth Exemplary Embodiment of the present invention will be described below. Referring to FIG. 12A and FIG. 12B, the vibration reduction structure is provided with a plate-like member 41 that is configured as a floor member. In addition, the vibration reduction structure is provided with a frame 42 that is a base for supporting the plate-like member 41. The plate-like member 41 has a rectangular shape, and is arranged such that a reverse surface 41a of which faces an open air side of an interior. The obverse surface 41a of the plate-like member 41 is configured as a surface of a floor of an interior. The frame 42 having a concave shape, is provided with an opening 42a that opens on the side of the open space of the interior. The plate-like members 41 is configured to be fitted into the opening 42a of the frame 42. An reverse surface 41b of the plate-like member 41 and a bottom surface 42b of the frame 42 are arranged with a clearance. A supporting member 43 is arranged on the bottom surface 42b of the frame 42. It is useful to use a steel-frame material, such as H-steel, I-beam, sleeper support, floor beam, and the like as an example of the supporting member 43. The plate-like member 41 is supported by the supporting member 43 described above. In addition, an air layer 44 surrounded by the reverse surface 41b of the plate-like member 41, the bottom surface 42b of the frame 42, and the supporting member 43, is formed between the plate-like member 41 and the frame 42. A clearance is formed between a peripheral portion 41c of the plate-like members 41 and a side wall surface 42c of the frame 42. The clearance is configured such that: air permeability between the air layer 44; and the open space is achieved.

A plurality of air holes 43a is provided to the supporting member 43 as ventilation portions that communicate through the air layer 44 and the open space. In this case, similarly to the First Exemplary Embodiment, the shape, the dimension, the quantity, and the like of the air hole 43a are determined such that the average value of the flow resistance on the surface of the plate-like members 41 that forms the air layer 44, is in the range greater than 0 N·s/m$^3$ and equal to or less than 1,000 N·s/m$^3$.

Similarly to the First Exemplary Embodiment, the shape, the dimension, the quantity, and the like of the air hole 43a can be determined such that the sound pressure level generated within the air layer 44 by applying an external force to the air layer 44 is reduced by 3 dB or more in a dominant frequency, in comparison with a case in which the plate-like members 41 has no air permeability. Note that the dominant frequency is based on characteristics of a series of systems consisting of the plate-like members 41, the frame 42, and the air layer 44.

Similarly to the First Exemplary Embodiment, the shape, the dimension, the quantity, and the like of the air hole 43a can be determined such that: the average value of the flow resistance on the surface of the plate-like members 41 that forms the air layer 44, is in the range greater than 0 N·s/m$^3$ and equal to or less than 1,000 N·s/m$^3$; and the sound pressure level generated within the air layer 44 by applying an external force to the air layer 44 is reduced by 3 dB or more in a dominant frequency, in comparison with a case in which the plate-like members 41 has no air permeability. Note that the dominant frequency is based on characteristics of a series of systems consisting of the plate-like members 41, the frame 42, and the air layer 44.

As described above, according to the present Exemplary Embodiment, air can pass through the plate-like members 41 that has the flow resistance or the sound pressure reduction performance described above between the air layer 44 and the open space. As a result, the spring characteristic and the damping characteristic that are obtained based on the air layer 44, act to reduce vibration. Accordingly, the vibration that may occur due to a load, such as an impact, can be effectively reduced.

Ninth Exemplary Embodiment

Figure 13A:
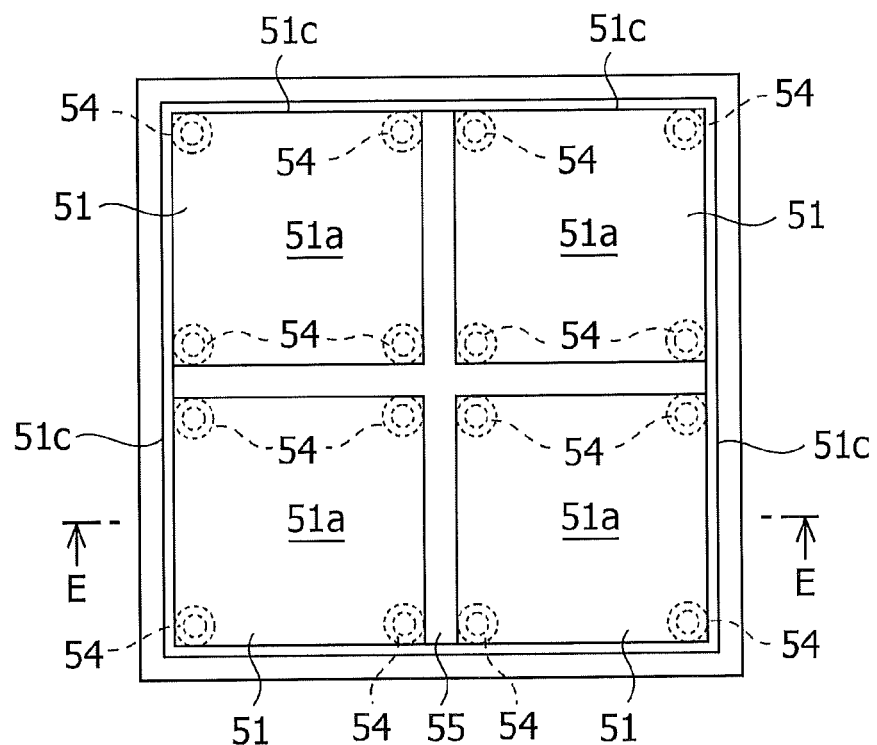
FIG. 13A is a plan view that illustrates an exemplary open air layer-type vibration reduction structure according to a Ninth Exemplary Embodiment of the present invention.
Figure 13B:
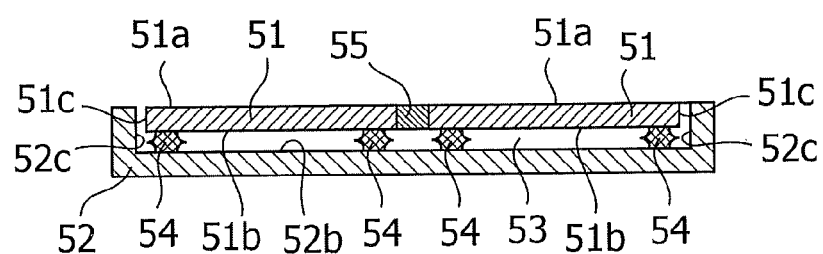
FIG. 13B is a cross section E-E of the example illustrated in FIG. 13A.

A vibration reduction structure according to the Ninth Exemplary Embodiment of the present invention will be described below. Referring to FIG. 13A and FIG. 13B, the vibration reduction structure is provided with a plate-like member 51 that is configured as a floor member. In this case, four plate-like members 51 are provided as an exemplary configuration. However, the configuration of the present Exemplary Embodiment is not limited to this. More specifically, two or more plate-like members 51 can be provided. In addition, the vibration reduction structure is provided with a frame 52 that is a base for supporting the plate-like member 51. The plate-like member 51 has a rectangular shape and the area of respective plate-like members 51 are the same as one another. The plate-like member 51 is arranged such that a obverse surface 51a thereof faces an open air side of an interior. The obverse surface 51a of the plate-like member 51 is configured as a surface of a floor of an interior. The four plate-like members 51 are arranged in a 2×2 matrix. The frame 52 having a concave shape, is provided with an opening 52a that opens on the side of the open space of the interior. The plate-like members 51 arranged in the above-described matrix, is configured to be fitted into the opening 52a of the frame 52. An reverse surface 51b of the plate-like member 51, and a bottom surface 52b of the frame 52 are arranged with a clearance. In addition, an air layer 53 surrounded by the reverse surface 51b of the plate-like member 51, and the bottom surface 52b and a side, wall surface 52c of the frame 52, is formed between the plate-like member 51 and the frame 52. A vibration proof rubber 54 is arranged on the bottom surface 52b of the frame 52 so as to correspond to each corner portion of the plate-like member 51. The plate-like member 51 is supported by the vibration proof rubber 54. A clearance is formed between a peripheral portion 51c of the plate-like members 51 and the side wall surface 52c of the frame 52. The clearance is configured such that air permeability between the air layer 53 and the open space is achieved. The peripheral portions 51c of the plate-like member 51 provided adjacent to one another are connected to one another by using a vibration insulation material 55.

As described above, according to the present Exemplary Embodiment, the plurality of plate-like members 51 is arranged in the same area as the area in which the only plate-like member is arranged in the conventional method. As a result, the mass of the plate-like members 51 in a spring-mass system constituted by the respective plate-like members 51, becomes smaller in comparison with the conventional method in which a vibration reduction structure is constituted by one plate-like member only. In addition, according to the present Exemplary Embodiment, the resonance frequency in the vibration reduction structure can be moved to the frequency band outside the frequency band that problems against vibration control may easily arise. Furthermore, the plurality of the plate-like members 51 is connected to one another by using the vibration insulation material 55, and therefore, the transmission of the vibration that may occur among the respective plate-like members 51 to respective adjacent plate-like members 51 can be prevented. As a result, the increase in the vibration that may occur in the respective plate-like members 51 that may occur due to the vibration of the adjacent plate-like members 51, can be prevented.

Tenth Exemplary Embodiment

A vibration reduction structure according to the Tenth Exemplary Embodiment of the present invention will be described below. A vibration reduction structure according to the present Exemplary Embodiment has a configuration similar to that of the vibration reduction structure according to the First Exemplary Embodiment. Components of the present Exemplary Embodiment similar to those of the First Exemplary Embodiment are provided with the same reference numerals, symbols, and names of those of the vibration reduction structure according to the First Exemplary Embodiment. Hereinbelow, the configuration different from that of the First Exemplary Embodiment only will be described.

Figure 14:
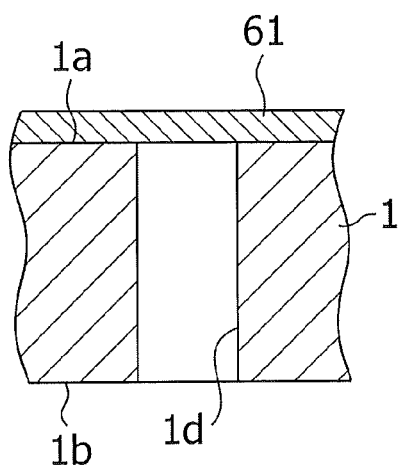
FIG. 14 is a cross section of a part of a plate-like member used in an open air layer-type vibration reduction structure according to a Tenth Exemplary Embodiment of the present invention.

Referring to FIG. 14, the vibration reduction structure according to the present Exemplary Embodiment is provided with an acoustically transparent member 61 that is arranged on the obverse surface 1a of the plate-like member 1. The acoustically transparent member 61 covers the air hole 1d of the plate-like member 1. The acoustically transparent member 61 has a sound insulation performance of reducing the sound pressure level by 0 to 2 dB in the frequency domain of 30 to 300 Hz. In the technical field of the present invention, a member that has a sound insulation performance as slight as the sound insulation performance described above only, is referred to as an "acoustically transparent member". In this case, as an exemplary configuration, it is useful in a case in which the acoustically transparent member 61 is formed in a sheet-like shape. Note that the acoustically transparent member 61 can be arranged on the reverse surface 1b of the plate-like member 1 instead of providing the same on the obverse surface 1a of the plate-like member 1. In addition, the acoustically transparent member 61 can be arranged inside the air hole 1d that is provided between the obverse surface 1a and the reverse surface 1b of the plate-like member 1 instead of providing the same on the obverse surface 1a of the plate-like member 1.

As described above, according to the present Exemplary Embodiment, the air hole 1d is covered with the acoustically transparent member 61 that has the slight sound insulation performance only. Accordingly, the vibration reduction performance that is achieved due to the flow resistance of the plate-like member 1 and the effect of reducing the sound pressure level in the air layer 3, does not degrade. The acoustically transparent member 61 described above provides the air hole 1d with the water resistance and the dust resistance. As a result, the present Exemplary Embodiment can prevent foreign particles from entering the air layer 3 via the air hole 1d. With the configuration described above, the present Exemplary Embodiment can allow the vibration reduction structure used as a structure in which no problem may occur in practical use thereof.

The Exemplary Embodiments of the present invention are as described above. However, the present invention is not limited to the Exemplary Embodiments described above. More specifically, various modifications and alterations can be made on the basis of the technical idea of the present invention.

For example, as a First modification of the present invention, a load from the plate-like member toward the frame can be applied to a peripheral portion of the plate-like member of the respective Exemplary Embodiments. The vibration that may occur due to the characteristics of the plate-like member, can be further reduced with the load described above.

As a Second modification of the present invention, each of the plurality of plate-like members 31 and 51 can have different areas or different rigidity levels in the Seventh Exemplary Embodiment and the Ninth Exemplary Embodiment of the present invention. With this configuration, the resonance frequency levels in the spring-mass system constituted by the respective plate-like members differ because the respective plate-like members have different mass. Accordingly, an increase in the vibration of the plurality of plate-like members at the same resonance frequency, can be prevented due to a great vibration of the respective plate-like members at the same resonance frequency. As a result, the vibration that may occur due to a load such as an impact can be further effectively reduced.

As a Third modification of the present invention, the air holes can be further provided to the entire plate-like members 31 and 51 and in the center, on the peripheral portion, and the like of the plate-like members 31 and 51 in the Seventh Exemplary Embodiment and the Ninth Exemplary Embodiment of the present invention. In this case, similarly to the First Exemplary Embodiment, the shape, the dimension, the quantity, and the like of the air hole can be determined such that the average value of the flow resistance on the surface of the plate-like members 31 and 51 that forms the air layers 33 and 53, is in the range greater than $0 \text{ N·s/m}^3$ and equal to or less than $1,000 \text{ N·s/m}^3$. In addition, similarly to the First Exemplary Embodiment, the dimension, the quantity, and the like of the air holes are determined such that the sound pressure level generated within the air layers 33 and 53 by applying an external force to the air layers 33 and 53, is reduced by 3 dB or more in a dominant frequency, in comparison with a case in which the plate-like members 31 and 51 has no air permeability. Note that the dominant frequency is based on characteristics of a series of systems consisting of the plate-like members 31 and 51, the frames 32 and 52, and the air layers 33 and 53. With the configuration described above, the same effects as those of the Seventh Exemplary Embodiment and the Ninth Exemplary Embodiment can be achieved.

As a Fourth modification of the present invention, in the Ninth Exemplary Embodiment, no clearance can be formed between the peripheral portion 51c of the plate-like member 51 and the side wall surface 52c, and the ventilation between the air layer 53 and the open space can be omitted. With the configuration described above, the same effect as that of the Ninth Exemplary Embodiment can be achieved.

As a Fifth modification of the present invention, in the First Exemplary Embodiment and the Fourth Exemplary Embodiment, the plate-like members 1 and 21 can be configured by a porous material. With the configuration described above, the same effects as those of the First Exemplary Embodiment and the Fourth Exemplary Embodiment can be achieved.

As a Sixth modification of the present invention, the plate-like member of the respective Exemplary Embodiments can have a shape other than the rectangular shape, such as a polygonal shape, a circular shape, an elliptical shape, an arc-like shape, and the like. With the configuration described above, the same effects as those of the respective Exemplary Embodiments can be achieved.

As a Seventh modification of the present invention, the vibration proof rubber according to the respective Exemplary Embodiments can be arranged at a location other than the location corresponding to the corner portions of the plate-like member. The quantity of the vibration proof rubbers can be appropriately adjusted so that the vibration proof rubber can support the plate-like member. With the configuration described above, the same effects as those of the respective Exemplary Embodiments can be achieved.

As an Eighth modification of the present invention, a sound absorbing material can be arranged in the air hole or the clearance and/or the air layer of the respective Exemplary Embodiments. In this case, it is useful when the ventilation portions are formed on the plate-like member or the frame such that the average value of the flow resistance on the surface of the plate-like member or the frame on which the air layer is formed is in the range greater than $0 \text{ N·s/m}^3$ and equal to or less than $1,000 \text{ N·s/m}^3$. Alternatively, it is useful in a case in which the ventilation portions are formed on the plate-like member or the frame so that the sound pressure level generated within the air layer by applying an external force to the air layer is reduced by 3 dB or more in a dominant frequency, in comparison with a case in which the plate-like member or the frame has no air permeability. Note that the dominant frequency is based on characteristics of a series of systems consisting of the plate-like member, the frame, and the air layer. With the configuration described above, the same effects as those of the respective Exemplary Embodiments of the present invention can be achieved.

As a Ninth modification of the present invention, in the Tenth Exemplary Embodiment, the acoustically transparent member 61 can be arranged such that the acoustically transparent member 61 covers the ventilation portion of the Second Exemplary Embodiment to the Ninth Exemplary Embodiment. With the configuration described above, the same effect as that of the Tenth Exemplary Embodiment can be achieved.

As a Tenth modification of the present invention, in the First Exemplary Embodiment to the Seventh Exemplary Embodiment, the Ninth exemplary embodiment, and the Tenth Exemplary Embodiment, the vibration proof rubber can be omitted. In this case, the plate-like member can be freely supported by lifting the same as an exemplary configuration. With the configuration described above, the same effects as those of the First Exemplary Embodiment to the Seventh Exemplary Embodiment, the Ninth Exemplary Embodiment, and the Tenth Exemplary Embodiment can be achieved.

As an Eleventh modification of the present invention, in the First Exemplary Embodiment to the Sixth Exemplary Embodiment and the Tenth Exemplary Embodiment, the air holes can be formed to both the plate-like member and the frame. With the configuration described above, the same effects as those of the First Exemplary Embodiment to the Sixth Exemplary Embodiment and the Tenth Exemplary Embodiment can be achieved.

EXAMPLE

An Example of the present invention will be described in detail below. In the Example of the present invention, a vibration reduction structure having a configuration similar to the configuration of the First Exemplary Embodiment is used. In the present Example, the thickness of the plate-like member 1 is 100 mm. In addition, a plurality of air holes 1d penetrating through the plate-like member 1 in the direction of thickness of the plate-like member 1 is provided in the plate-like member 1. In the vibration reduction structure described above, the side of the frame 2 is excited by using a vibration generator. The vibration acceleration levels, at a plurality of locations on the plate-like member 1 and the frame 2, are respectively measured. The results are calculated for each frequency by using the amount of vibration insulation effects, i.e., a difference between an average value of the vibration acceleration of the plate-like member 1 measured at a plurality of locations and the average value of the vibration acceleration of the frame 2 measured at a plurality of locations (=(average value of the vibration acceleration of the frame)−(average value of the vibration acceleration of the floor member)).

COMPARATIVE EXAMPLE

A Comparative Example of the present invention will be described in detail below. The vibration insulation structure according to the present Comparative Example basically has a configuration substantially similar to that of the Example of the present invention. However, the plate-like member according to the present comparative example is different from the plate-like member according to the Example in a point that the plate-like member according to the Comparative Example has no air hole. In the present Comparative Example, results are calculated for the vibration insulation effect amount similarly to the Example.

Figure 15:
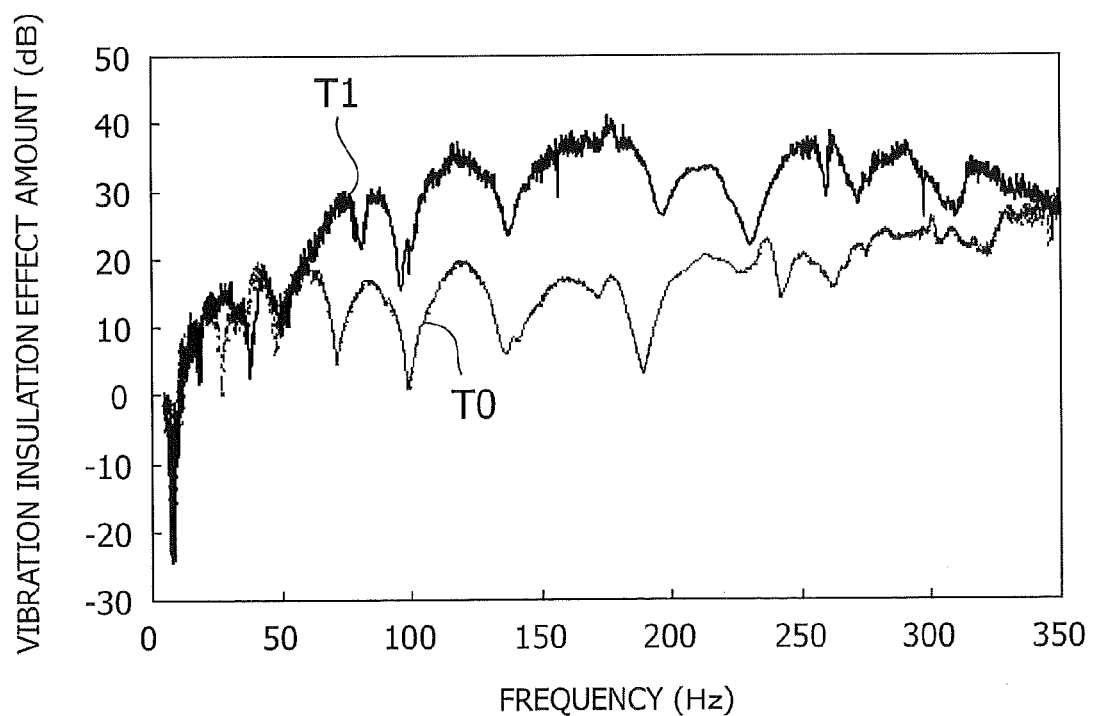
FIG. 15 is a diagram that illustrates a comparison between vibration insulation effect amounts according to Example and Comparative Example of the present invention.
Figure 16:
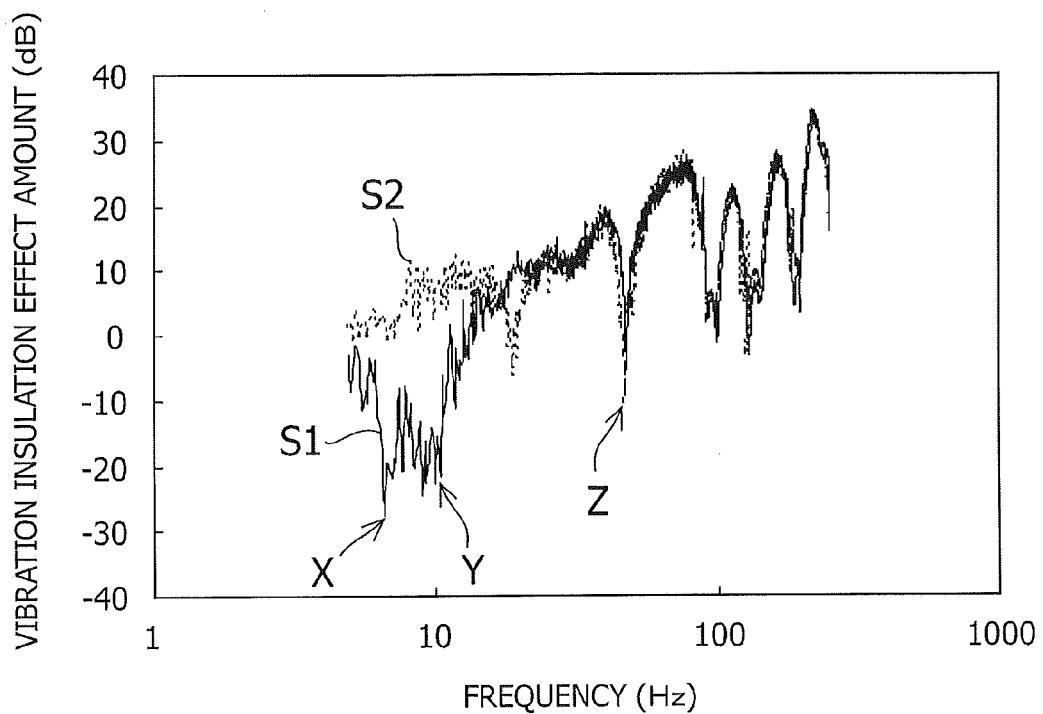
FIG. 16 is a diagram that illustrates a comparison between a vibration insulation effect amount obtained if a vibration proof rubber is provided and a vibration insulation effect amount obtained if no vibration proof rubber is provided and a floor member is freely supported by lifting the floor member.
Figure 17:
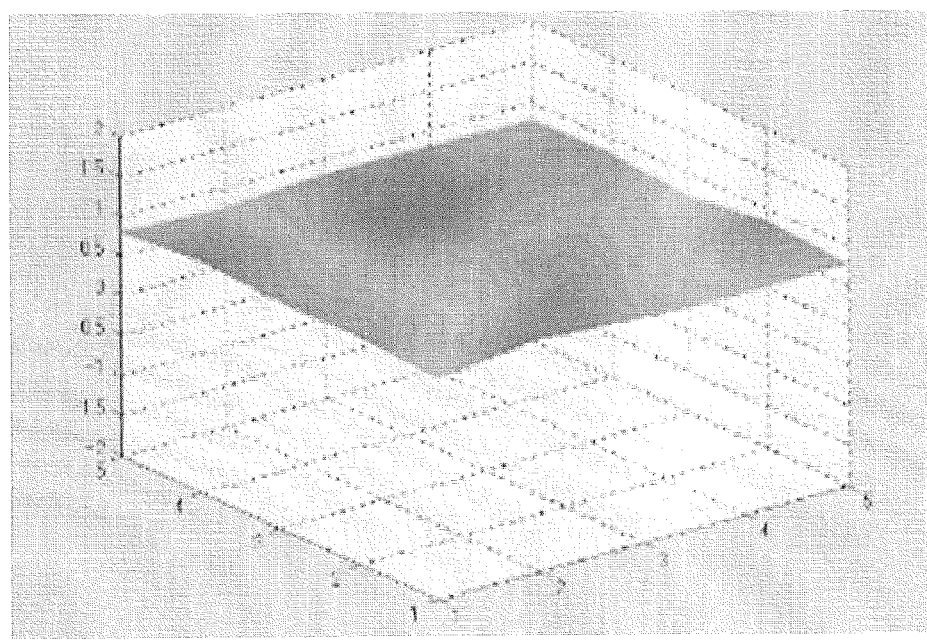
FIG. 17 is a diagram that illustrates a normal mode of vibration at a peak illustrated with a sign "X" illustrated in FIG. 16.
Figure 18:
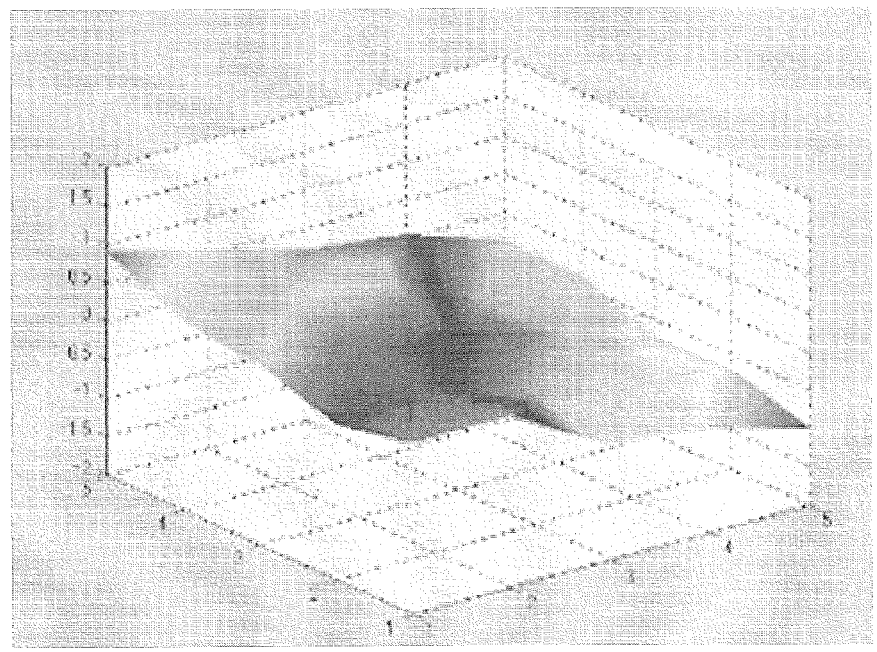
FIG. 18 is a diagram that illustrates a normal mode of vibration at a peak illustrated with a sign "Y" illustrated in FIG. 16.
Figure 19:
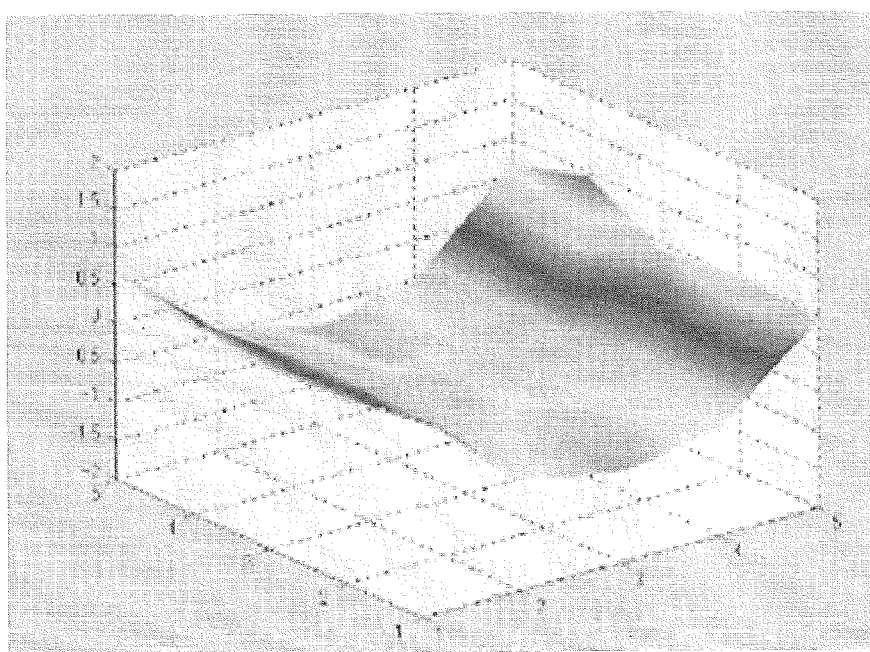
FIG. 19 is a diagram that illustrates a normal mode of vibration at a peak illustrated with a sign "Z" illustrated in FIG. 16.

FIG. 15 illustrates a comparison between the vibration insulation effect amounts of the Example and the Comparative Example. A solid line T1 corresponds to results obtained for the Example. On the other hand, a broken line T0 corresponds to results obtained for the Comparative example. Note that in the chart illustrated in FIG. 15, the vibration insulation effect amount (dB) is taken on the vertical axis and the frequency (Hz) is taken on the horizontal axis. The amount of vibration insulation effects of the working example is lower than the amount of vibration insulation effects of the comparative example at the frequency of 50 Hz to 300 Hz. In other words, in the vibration reduction structure according to the Example, the vibration of the plate-like member in relation to the frame is reduced by the air hole 1d at the frequency of 50 Hz to 300 Hz, in comparison with the vibration reduction structure according to the Comparative Example.

What is claimed is:

1. An open air layer-type vibration reduction structure comprising:
    at least one plate-like member arranged such that an obverse surface thereof faces an open space; and
    a frame arranged with an interval from a reverse surface of the plate-like member that opposes the obverse surface of the plate-like member;
    wherein an air layer is formed between the plate-like member and the frame;
    wherein the at least one plate-like member can move toward the open space and the air layer in relation to the frame;
    wherein at least one vibration proof rubber is arranged between the at least one plate-like member and the frame so as to support the at least one plate-like member; and
    wherein ventilation portions having air permeability are formed by at least one of the at least one plate-like member and the frame such that an average value of flow resistance on a surface of at least one of the at least one plate-like member and the frame, which forms the air layer, is in a range greater than 0N·s/m³ and equal to or less than 1,000 N·s/m³.

2. The open air layer-type vibration reduction structure according to claim 1,
    wherein the ventilation portions are further configured such that a sound pressure level generated within the air layer by applying an external force to the air layer, is reduced by 3 dB or more in a dominant frequency, in comparison with a case in which the at least one plate-like member and the frame have no air permeability, the dominant frequency being that in which amplitude based on characteristics of a series of systems including the at least one plate-like member, the frame, the at least one vibration proof rubber, and the air layer, is maximum.

3. The open air layer-type vibration reduction structure according to claim 1,
    wherein the ventilation portions are formed by providing air holes in an entirety of the at least one plate-like member or a part of the at least one plate-like member.

4. The open air layer-type vibration reduction structure according to claim 1,
    wherein the ventilation portions are formed by providing air holes in an entirety of the frame or a part of the frame.

5. The open air layer-type vibration reduction structure according to claim 1,
    wherein the at least one plate-like member conjures a plurality of plate-like members,
    wherein the plurality of plate-like members is arranged adjacent to one another, and
    wherein the ventilation portions are formed by providing a clearance between mutually adjacent plate-like members.

6. The open air layer-type vibration reduction structure according to claim 1,
    wherein the at least one plate-like member conjures a plurality of plate-like members,
    wherein the plurality of plate-like members is arranged adjacent to one another, and
    wherein mutually adjacent plate-like members are connected to one another by using a vibration insulation material.

7. The open air layer-type vibration reduction structure according to claim 1,
    wherein an acoustically transparent member is arranged in the ventilation portion, the acoustically transparent member having a sound insulation performance of reducing the sound pressure level by 0 dB to 2 dB in a frequency domain of 30 Hz to 300 Hz.

8. The open air layer-type vibration reduction structure according to claim 1,
    wherein a load from the at least one plate-like member toward the frame is applied to a peripheral portion of the at least one plate-like member.

9. The open air layer-type vibration reduction structure according to claim 1,
    wherein the ventilation portions are formed by providing air holes in an entirety of the frame or a part of the frame.

10. An open air layer-type vibration reduction structure comprising:
    at least one plate-like member arranged such that an obverse surface thereof faces an open space; and
    a frame spaced at an interval from a reverse surface of the at least one plate-like member that opposes the obverse surface of the at least one plate-like member;
    wherein an air layer is formed between the at least one plate-like member and the frame;
    wherein the at least one plate-like member can move toward the open space and the air layer in relation to the frame;
    wherein at least one vibration proof rubber is arranged between the at least one plate-like member and the frame so as to support the at least one plate-like member; and
    wherein ventilation portions are provided in at least one of the at least one plate-like member and the frame such that a sound pressure level generated within the air layer by applying an external force to the air layer, is reduced by 3 dB or more in a dominant frequency, in comparison with a case in which the at least one plate-like member and the frame have no air permeability, the dominant frequency being that in which amplitude based on characteristics of a series of systems including the at least one plate-like member, the frame, the at least one vibration proof rubber, and the air layer, is maximum.

11. The open air layer-type vibration reduction structure according to claim 10, wherein the ventilation portions are formed by providing air holes in an entirety of the at least one plate-like member or a part of the at least one plate-like member.

12. The open air layer-type vibration reduction structure according to claim 10,
   wherein the at least one plate-like member conjures a plurality of plate-like members,
   wherein the plurality of plate-like members is arranged adjacent to one another, and
   wherein the ventilation portions are formed by providing a clearance between the mutually adjacent plate-like members.

13. The open air layer-type vibration reduction structure according to claim 10,
   wherein the at least one plate-like member conjures a plurality of plate-like members,
   wherein the plurality of plate-like members is arranged adjacent to one another, and
   wherein mutually adjacent plate-like members are connected to one another by using a vibration insulation material.

14. The open air layer-type vibration reduction structure according to claim 10,
   wherein an acoustically transparent member is arranged in the ventilation portion, the acoustically transparent member having a sound insulation performance of reducing the sound pressure level by 0 dB to 2 dB in a frequency domain of 30 Hz to 300 Hz.

15. The open air layer-type vibration reduction structure according to claim 10,
   wherein a load from the at least one plate-like member toward the frame is applied to a peripheral portion of the at least one plate-like member.

* * * * *